(12) United States Patent
Okumura

(10) Patent No.: US 10,894,898 B2
(45) Date of Patent: Jan. 19, 2021

(54) WATER-BASED INK FOR INK-JET RECORDING AND INK CONTAINER

(71) Applicant: Brother Kogyo Kabushiki Kaisha, Nagoya (JP)

(72) Inventor: Yuki Okumura, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 521 days.

(21) Appl. No.: 15/849,888

(22) Filed: Dec. 21, 2017

(65) Prior Publication Data

US 2018/0282563 A1 Oct. 4, 2018

(30) Foreign Application Priority Data

Mar. 29, 2017 (JP) ................... 2017-065293

(51) Int. Cl.
*C09D 11/00* (2014.01)
*C09D 11/38* (2014.01)
(Continued)

(52) U.S. Cl.
CPC ............ *C09D 11/38* (2013.01); *C09D 11/328* (2013.01)

(58) Field of Classification Search
USPC .......... 106/31.01, 31.13, 31.27, 31.47, 31.48
See application file for complete search history.

(56) References Cited

U.S. PATENT DOCUMENTS 8,016,404 B2 * 9/2011 Kato .................. C09D 11/54
347/96
8,603,232 B2 12/2013 Tsuzaka et al.
(Continued)

FOREIGN PATENT DOCUMENTS

CN 103254676 A 8/2013
JP 2002-97392 A 4/2002
(Continued)

OTHER PUBLICATIONS

Nov. 4, 2020—(JP) Notice of Reasons for Refusal—App 2017-065293, Eng Tran.

*Primary Examiner* — James E McDonough
(74) *Attorney, Agent, or Firm* — Banner & Witcoff, Ltd.

(57) ABSTRACT

There is provided a water-based ink for ink-jet recording, including: a dye; water; and a compound represented by the following formula (1):

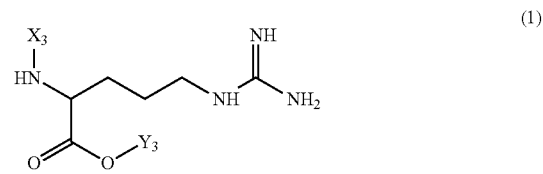

(1)

wherein in the formula (1), $X_3$ represents a group represented by the following formula (2) and $Y_3$ represents a hydrogen atom, or the $X_3$ represents a group represented by the following formula (3) and the $Y_3$ is an ethyl group; and (2)

(Continued)

-continued

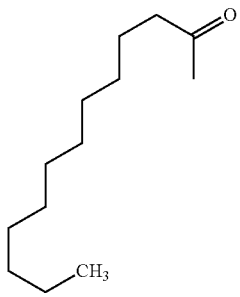

(3)

in the formula (2), $R_3$ represents a straight-chain or branched-chain alkyl group having 12 to 14 carbons.

18 Claims, 1 Drawing Sheet

(51) Int. Cl.
*C09D 11/328* (2014.01)
*C09D 1/00* (2006.01)
*C09D 4/00* (2006.01)
*C09D 5/00* (2006.01)
*C09K 3/00* (2006.01)

(56) References Cited

U.S. PATENT DOCUMENTS

| | | | |
|---|---|---|---|
| 2004/0134381 | A1 | 7/2004 | Taguchi et al. |
| 2007/0120920 | A1* | 5/2007 | Taguchi ............ C09D 11/38 347/100 |
| 2007/0240608 | A1* | 10/2007 | Ogawa ............ C09D 11/38 106/31.52 |
| 2008/0241398 | A1 | 10/2008 | Kato et al. |
| 2010/0075040 | A1* | 3/2010 | Tateishi ............ C09D 11/328 427/256 |
| 2011/0183913 | A1* | 7/2011 | Miyamoto ........ C07K 5/06026 514/18.8 |
| 2012/0081453 | A1* | 4/2012 | Tsuzaka ............ C09D 11/328 347/20 |

FOREIGN PATENT DOCUMENTS

| | | |
|---|---|---|
| JP | 2002-226740 A | 8/2002 |
| JP | 2004-143292 A | 5/2004 |
| JP | 2004-211022 A | 7/2004 |
| JP | 2007-070566 A | 3/2007 |
| JP | 2008115225 A | 5/2008 |
| JP | 2008-246821 A | 10/2008 |
| JP | 5971639 B2 | 8/2016 |

* cited by examiner

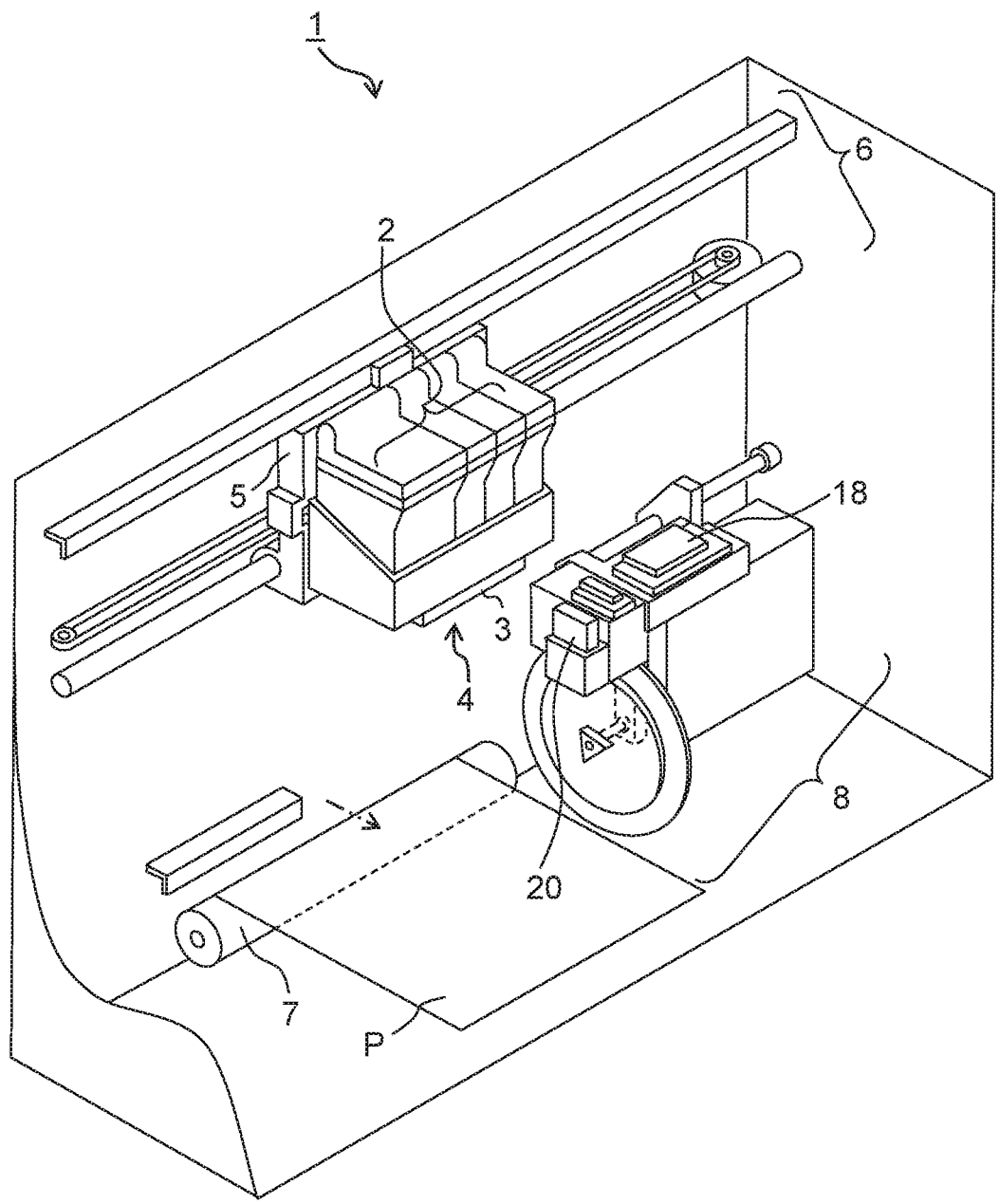

WATER-BASED INK FOR INK-JET RECORDING AND INK CONTAINER

CROSS REFERENCE TO RELATED APPLICATION

The present application claims priority from Japanese Patent Application No. 2017-065293 filed on Mar. 29, 2017 the disclosure of which is incorporated herein by reference in its entirety.

BACKGROUND

Field of the Invention

The present invention relates to a water-based ink for ink-jet recording, and an ink container which accommodates the water-based ink for ink-jet recording therein.

Description of the Related Art

A water-based ink for ink-jet recording which contains a dye as a colorant has such a problem that the water resistance of a printed matter, formed by using the same, is low since the dye is dissolved in water. In order to improve the water resistance of the printer matter formed by using the water-based ink for ink-jet recording which contains the dye, there is proposed a water-based ink for ink-jet recording which contains a cationic polymer or a cationic compound (see, for example, Japanese Patent Application Laid-open No. 2007-070566 and Japanese Patent Application Laid-open No. 2004-211022 corresponding to United State Patent Application Publication No. US2004/013438). Further, there is also proposed a method including preparing a treatment liquid which contains a cationic polymer, etc., separately from a water-based ink; and applying the treatment liquid to a recorded portion which is (to be) formed by using the water-based ink before or after ink-jet recording with the water-based ink. The cationic polymer, etc., in the water-based ink or in the treatment liquid allows the dye to aggregate on the printed matter, which results in the improvement in the water resistance of the printer matter.

However, the water resistance of the printed matter formed by using the water-based ink containing the dye is still insufficient, and further improvement in the water resistance of the printer matter is desired. Further, regarding the water-based ink containing the cationic polymer, etc., in addition to the dye, there is such a fear that the dye and the cationic polymer are bonded to each other in the water-based ink to thereby generate any deposit or precipitate (insoluble matter) in the water-based ink. In particular, in such a case that a part or portion of a solvent of the water-based ink is evaporated, the deposit is easily generated. Under a condition that such a deposit is generated in the vicinity of an ink jetting surface (ink discharging surface) of an ink-jet head, this might cause any jetting failure (unsatisfactory jetting) of the water-based ink. On the other hand, in a case that the treatment liquid contains the cationic polymer, any deposit is not generated in the water-based ink. However, preparing the treatment liquid separately from the water-based ink causes an ink-jet recording apparatus to be complex and large, increasing the cost.

The present teaching has been made in view of the above-described situations, and an object of the present teaching is to provide a water-based ink which contains a dye as a colorant, which realizes high water resistance of a printed matter without using any treatment liquid, and in which any deposit is hardly generated.

SUMMARY

According to a first aspect of the present teaching, there is provided a water-based ink for ink-jet recording, including:
a dye;
water; and
a compound represented by the following formula (1):

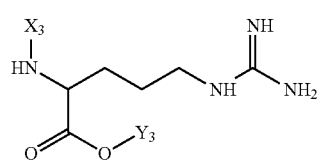

wherein in the formula (1), $X_3$ represents a group represented by the following formula (2) and $Y_3$ represents a hydrogen atom, or the $X_3$ represents a group represented by the following formula (3) and the $Y_3$ is an ethyl group; and

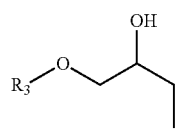

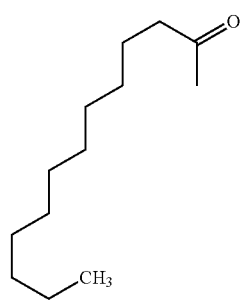

in the formula (2), R3 represents a straight-chain or branched-chain alkyl group having 12 to 14 carbons.

According to a second aspect of the present teaching, there is provided a container which accommodates the water-based ink for ink for ink-jet recording of the first aspect therein.

BRIEF DESCRIPTION OF THE DRAWINGS

The FIGURE is a schematic perspective view depicting the configuration of an example of an ink-jet recording apparatus of an embodiment of the present teaching.

DESCRIPTION OF THE EMBODIMENTS

An explanation will be given about a water-based ink for ink-jet recording (hereinafter referred also to as a "water-based ink" or an "ink" in some cases) of an embodiment of the present teaching. The water-based ink of the present embodiment contains a dye, a compound represented by the formula (1), and water.

Although the dye is not particularly limited, the dye is preferably, for example, a dye represented by the following formula (Y-1), Color Index (hereinafter referred to as C. I.) Direct Yellow 86, a dye represented by the following formula (M-1) and a dye represented by the following formula (M-2). The dye represented by the following formula (Y-1), the dye represented by the following formula (M-1) and the dye represented by the following formula (M-2) are respectively, for example, a dye (Y-1), a dye (M-2b) and a dye (M-2a) which are disclosed in U.S. Pat. No. 8,603,232 corresponding to Japan Patent No. 5971639 The disclosure of U.S. Pat. No. 8,603,232 is incorporated herein by reference in its entirety.

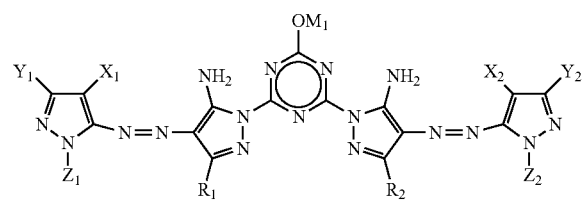

(Y-1)

In the formula (Y-1), $R_1$, $R_2$, $Y_1$, and $Y_2$ each represent a monovalent group, and may be identical to or different from each other;

$X_1$ and $X_2$ each represent an electron attractive group, and may be identical to or different from each other;

$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other; and $M_1$ represents a hydrogen atom or a cation.

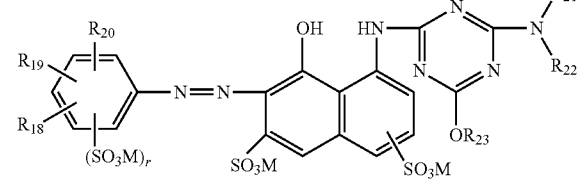

(M-1)

In the formula (M-1), r is 0, 1 or 2;

$R_{18}$, $R_{19}$ and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group, a substituted or unsubstituted arylsulfonyl group, a carboxy group or a carboxylate group;

the $R_{18}$, $R_{19}$ and $R_{20}$ may be identical to or different from each other;

$R_{21}$, $R_{22}$ and $R_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group;

the $R_{21}$, $R_{22}$ and $R_{23}$ may be identical to or different from each other;

in a case that any one of the $R_{18}$ to $R_{23}$ has an acid group or acid groups, a part or all of the acid groups may be a salt type group; namely, in a case that any one of the $R_{18}$ to $R_{23}$ has an acid group or groups, all the acid groups are not neutralized, or a part of all of the acid groups is the salt type group;

each of three Ms may be any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$; and the three Ms may be identical to or different from each other.

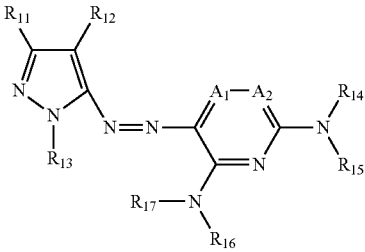

(M-2)

In the formula (M-2), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and the $R_{14}$, $R_{15}$, $R_{16}$, and $R_{17}$ may be identical to or different from each other, not both of the $R_{14}$ and $R_{15}$ are hydrogen atoms, and not both of the $R_{16}$ and $R_{17}$ are hydrogen atoms; and $A_1$ and $A_2$ are both substituted or unsubstituted carbon atoms, or one of the $A_1$ and $A_2$ is a substituted or unsubstituted carbon atom and the other is a nitrogen atom.

In the formula (Y-1), $R_1$, $R_2$, $Y_1$, and $Y_2$ each represent a monovalent group, and may be identical to or different from each other. The monovalent group is a hydrogen atom, or a monovalent substituent. The monovalent substituent includes a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxycarbonyloxy group, an amino group such as an alkylamino group or an arylamino group, an amide group, an acylamino group, an ureido group, an amino carbonyl amino group, an alkoxy carbonyl amino group, an aryloxycarbonyl amino group, a sulfamoyl amino group, an alkyl sulfonyl amino group, an aryl sulfonyl amino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxycarbonyl group, an alkoxy carbonyl group, a carbamoyl group, a phosphino group, a phosphinyl group, a phosphinyloxy group, a phosphinyl amino group, a silyl group, an azo group, an imide group, and the like. Each of the above-described monovalent substituents may further have a substituent. Among these, the monovalent substituent is preferably a hydrogen atom, a halogen atom, an alkyl group, an aryl group, a heterocyclic group, a cyano group, an alkoxy group, an amide group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent is more preferably a hydrogen atom, an alkyl group, an aryl group, a cyano group, or an alkyl sulfonyl group.

In the formula (Y-1), the halogen atom is a chlorine atom, a bromine atom, or an iodine atom. Among these, the halogen atom is preferably a chlorine atom or a bromine atom.

In the formula (Y-1), the alkyl group includes a substituted or unsubstituted alkyl group. The substituted or unsubstituted alkyl group is preferably an alkyl group having 1 to 30 carbon atom(s). The alkyl group includes a methyl group, an ethyl group, a butyl group, a tert-butyl group, a n-octyl group, an eicoxy group, a 2-chloroethyl group, a hydroxyethyl group, a cyano ethyl group, a 4-sulfobutyl group, and the like. The substituent of the substituted alkyl group includes, for example, a straight or branched chain alkyl group having 1 to 12 carbon atom(s) such as a methyl group, an ethyl group, a propyl group, an isopropyl group, a sec-butyl group, a tert-butyl group, a 2-ethylhexyl group, a 2-methyl sulfonyl ethyl group, a 3-phenoxypropyl group, a trifluoromethyl group, or the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group or the like; a straight or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-amyl phenyl group, or the like; a heterocyclic group such as an imidazolyl group, a pyrazolyl group, a triazolyl group, a 2-furyl group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methyl sulfonyl ethoxy group, or the like; an aryloxy group such as a phenoxy group, a 2-methyl phenoxy group, a 4-tert-butyl phenoxy group, a 3-nitro phenoxy group, a 3-tert-butyloxy carbonyl phenoxy group, a 3-methoxy carbonylphenyloxy group, or the like; an acylamino group such as an acetamide group, a benzamide group, a 4-(3-tert-butyl-4-hydroxy phenoxy)butaneamide group, or the like; an alkylamino group such as a methylamino group, a butylamino group, a diethylamino group, a methyl butylamino group, or the like; an aryl amino group such as a phenyl amino group, a 2-chloroanilino group, or the like; an ureido group such as a phenylureido group, a methylureido group, an N,N-dibutylureido group, or the like; a sulfamoyl amino group such as an N,N-dipropyl sulfamoyl amino group or the like; an alkyl thio group such as a methyl thio group, an octyl thio group, a 2-phenoxyethyl thio group, or the like; an aryl thio group such as a phenyl thio group, a 2-butoxy-5-tert-octylphenyl thio group, a 2-carboxy phenyl thio group, or the like; an alkoxy carbonyl amino group such as a methoxy carbonyl amino group or the like; an alkyl sulfonyl amino group such as a methyl sulfonyl amino group or the like; an aryl sulfonyl amino group such as a phenyl sulfonyl amino group, a p-toluene sulfonyl amino group, or the like; a carbamoyl group such as an N-ethyl carbamoyl group, an N,N-dibutyl carbamoyl group, or the like; a sulfamoyl group such as an N-ethyl sulfamoyl group, an N,N-dipropyl sulfamoyl group, an N-phenyl sulfamoyl group, or the like; a sulfonyl group such as a methyl sulfonyl group, an octyl sulfonyl group, a phenyl sulfonyl group, a p-toluene sulfonyl group, or the like; an alkoxy carbonyl group such as a methoxy carbonyl group, a butyloxy carbonyl group, or the like; a heterocyclic oxy group such as a 1-phenyltetrazol-5-oxy group, a 2-tetrahydropyranyloxy group, or the like; an azo group such as a phenylazo group, a 4-methoxyphenyl azo group, a 4-pivaloylamino phenylazo group, a 2-hydroxy-4-propanoyl phenylazo group, or the like; an acyloxy group such as an acetoxy group or the like; a carbamoyloxy group such as an N-phenylcarbamoyloxy group or the like; a silyloxy group such as a trimethyl silyloxy group, a dibutyl methyl silyloxy group, or the like; an aryloxy carbonyl amino group such as a phenoxy carbonyl amino group or the like; an imide group such as an N-succinimide group, an N-phthalimide group, or the like; a heterocyclic thio group such as a 2-benzothiazolyl thio group, a 2,4-diphenoxy-1,3,5-triazole-6-thio group, a 2-pyridylthio group, or the like; a sulfinyl group such as a 3-phenoxypropyl sulfinyl group or the like; a phosphonyl group such as a phenoxy phosphonyl group, an octyloxy phosphonyl group, a phenyl phosphonyl group, or the like; an aryloxy carbonyl group such as a phenoxy carbonyl group or the like; an acyl group such as an acetyl group, a 3-phenyl propanoyl group, a benzoyl group, or the like; and an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group, which are the substituents of the substituted alkyl group, are preferably those having branched chains, and especially preferably those having asymmetric carbons, from the view point of improving the solubility of the dye and the stability of the water-based ink. Among these, a hydroxy group, an alkoxy group, a cyano group, a halogen atom, a sulfo group (which may also be in the form of a salt), or a carboxyl group (which may also be in the form of a salt) is preferably used as the substituent of the substituted alkyl group.

In the formula (Y-1), the cycloalkyl group includes a substituted or unsubstituted cycloalkyl group. The substituted or unsubstituted cycloalkyl group is preferably a cycloalkyl group having 5 to 30 carbon atoms. The substituent of the substituted cycloalkyl group includes, for example, the substituents described for the substituted alkyl group. The cycloalkyl group includes, for example, a cyclohexyl group, a cyclopentyl group, a 4-n-dodecyl cyclohexyl group, and the like.

In the formula (Y-1), the aralkyl group includes a substituted or unsubstituted aralkyl group. The substituted or unsubstituted aralkyl group is preferably an aralkyl group having 7 to 30 carbon atoms. The substituent of the substituted aralkyl group includes, for example, the substituents described for the substituted alkyl group. The aralkyl group includes, for example, a benzyl group, a 2-phenethyl group, and the like.

In the formula (Y-1), the alkenyl group is a straight chain, branched, or cyclic substituted or unsubstituted alkenyl group. The alkenyl group is preferably a substituted or unsubstituted alkenyl group having 2 to 30 carbon atoms. The substituent of the substituted alkenyl group includes, for example, the substituents described for the substituted alkyl group. The alkenyl group includes, for example, a vinyl group, an allyl group, a prenyl group, a geranyl group, an oleyl group, a 2-cyclopentene-1-yl group, a cyclohexene-1-yl group, and the like.

In the formula (Y-1), the alkynyl group is a substituted or unsubstituted alkynyl group having 2 to 30 carbon atoms. The substituent of the substituted alkynyl group includes, for example, the substituents described for the substituted alkyl group. The alkynyl group includes, for example, an ethynyl group, a propargyl group, and the like.

In the formula (Y-1), the aryl group is a substituted or unsubstituted aryl group having 6 to 30 carbon atoms. The aryl group includes, for example, a phenyl group, a p-tolyl group, a naphthyl group, a m-chlorophenyl group, an o-hexadecanoyl aminophenyl group, and the like. The substituent of the substituted aryl group includes, for example, the substituents described for the substituted alkyl group.

In the formula (Y-1), the heterocyclic group is a monovalent group obtained by removing one hydrogen atom from a 5- or 6-membered substituted or unsubstituted, aromatic or nonaromatic heterocyclic compound, which may also be further condensed. The heterocyclic group is preferably a 5- or 6-membered aromatic heterocyclic group having 3 to 30 carbon atoms. The substituent of the substituted heterocyclic group includes, for example, the substituents described for the substituted alkyl group. The heterocyclic group includes, with no limitation on a substitution site, for example, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

In the formula (Y-1), the alkoxy group includes a substituted or unsubstituted alkoxy group. The substituted or unsubstituted alkoxy group is preferably an alkoxy group having 1 to 30 carbon atom(s). The substituent of the substituted alkoxy group includes, for example, the substituents described for the substituted alkyl group. The alkoxy group includes, for example, a methoxy group, an ethoxy group, an isopropoxy group, a n-octyloxy group, a methoxyethoxy group, a hydroxyethoxy group, a 3-carboxy propoxy group, and the like.

In the formula (Y-1), the aryloxy group is preferably a substituted or unsubstituted aryloxy group having 6 to 30 carbon atoms. The substituent of the substituted aryloxy group includes, for example, the substituents described for the substituted alkyl group. The aryloxy group includes, for example, a phenoxy group, a 2-methyl phenoxy group, a 4-tert-butyl phenoxy group, a 3-nitro phenoxy group, a 2-tetradecanoyl amino phenoxy group, and the like.

In the formula (Y-1), the silyloxy group is preferably a silyloxy group having 3 to 20 carbon atoms. The silyloxy group includes, for example, a trimethyl silyloxy group, a tert-butyldimethyl silyloxy group, and the like.

In the formula (Y-1), the heterocyclic oxy group is preferably a substituted or unsubstituted heterocyclic oxy group having 2 to 30 carbon atoms. The substituent of the substituted heterocyclic oxy group includes, for example, the substituents described for the substituted alkyl group. The heterocyclic oxy group includes, for example, a 1-phenyltetrazol-5-oxy group, a 2-tetrahydropyranyloxy group, and the like.

In the formula (Y-1), the acyloxy group is preferably a formyloxy group, a substituted or unsubstituted alkyl carbonyloxy group having 2 to 30 carbon atoms, or a substituted or unsubstituted aryl carbonyloxy group having 6 to 30 carbon atoms. The substituents of the substituted alkyl carbonyloxy group and the substituted aryl carbonyloxy group include, for example, the substituents described for the substituted alkyl group. The acyloxy group includes, for example, a formyloxy group, an acetyloxy group, a pivaloyloxy group, a stearoyloxy group, a benzoyloxy group, a p-methoxyphenyl carbonyloxy group, and the like.

In the formula (Y-1), the carbamoyloxy group is preferably a substituted or unsubstituted carbamoyloxy group having 1 to 30 carbon atom(s). The substituent of the substituted carbamoyloxy group includes, for example, the substituents described for the substituted alkyl group. The carbamoyloxy group includes, for example, an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

In the formula (Y-1), the alkoxy carbonyloxy group is preferably a substituted or unsubstituted alkoxy carbonyloxy group having 2 to 30 carbon atoms. The substituent of the substituted alkoxy carbonyloxy group includes, for example, the substituents described for the substituted alkyl group. The alkoxy carbonyloxy group includes, for example, a methoxy carbonyloxy group, an ethoxy carbonyloxy group, a tert-butoxy carbonyloxy group, a n-octyl carbonyloxy group, and the like.

In the formula (Y-1), the aryloxy carbonyloxy group is preferably a substituted or unsubstituted aryloxy carbonyloxy group having 7 to 30 carbon atoms. The substituent of the substituted aryloxy carbonyloxy group includes, for example, the substituents described for the substituted alkyl group. The aryloxy carbonyloxy group includes, for example, a phenoxy carbonyloxy group, a p-methoxyphenoxy carbonyloxy group, a p-n-hexadecyloxy phenoxy carbonyloxy group, and the like.

In the formula (Y-1), the amino group is preferably a substituted or unsubstituted alkylamino group having 1 to 30 carbon atom(s), or a substituted or unsubstituted arylamino group having 6 to 30 carbon atoms. The substituents of the substituted alkylamino group and the substituted arylamino group include, for example, the substituents described for the substituted alkyl group. The amino group includes, for example, an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

In the formula (Y-1), the acylamino group is preferably a formyl amino group, a substituted or unsubstituted alkyl carbonyl amino group having 1 to 30 carbon atoms, or a substituted or unsubstituted aryl carbonyl amino group having 6 to 30 carbon atoms. The substituents of the substituted alkyl carbonyl amino group and the substituted aryl carbonyl amino group include, for example, the substituents described for the substituted alkyl group. The acylamino group includes, for example, a formylamino group, an acetylamino group, a pivaloylamino group, a lauroylamino group, a benzoylamino group, a 3,4,5-tri-n-octyloxyphenyl carbonyl amino group, and the like.

In the formula (Y-1), the amino carbonyl amino group is preferably a substituted or unsubstituted amino carbonyl amino group having 1 to 30 carbon atom(s). The substituent of the substituted amino carbonyl amino group includes, for example, the substituents described for the substituted alkyl group. The amino carbonyl amino group includes, for example, a carbamoylamino group, an N,N-dimethylamino carbonyl amino group, an N,N-diethylamino carbonyl amino group, a morpholino carbonyl amino group, and the like.

In the formula (Y-1), the alkoxy carbonyl amino group is preferably a substituted or unsubstituted alkoxy carbonyl amino group having 2 to 30 carbon atoms. The substituent of the substituted alkoxy carbonyl amino group includes, for example, the substituents described for the substituted alkyl group. The alkoxy carbonyl amino group includes, for example, a methoxy carbonyl amino group, an ethoxy carbonyl amino group, a tert-butoxy carbonyl amino group, a n-octadecyloxy carbonyl amino group, an N-methyl-methoxy carbonyl amino group, and the like.

In the formula (Y-1), the aryloxy carbonyl amino group is preferably a substituted or unsubstituted aryloxy carbonyl amino group having 7 to 30 carbon atoms. The substituent of the substituted aryloxy carbonyl amino group includes, for example, the substituents described for the substituted alkyl group. The aryloxy carbonyl amino group includes, for example, a phenoxy carbonyl amino group, a p-chlorophenoxy carbonyl amino group, a m-n-octyloxy phenoxy carbonyl amino group, and the like.

In the formula (Y-1), the sulfamoyl amino group is preferably a substituted or unsubstituted sulfamoyl amino group having 0 to 30 carbon atoms. The substituent of the substituted sulfamoyl amino group includes, for example, the substituents described for the substituted alkyl group. The sulfamoyl amino group includes, for example, a sulfamoyl amino group, an N,N-dimethylamino sulfonyl amino group, an N-n-octylamino sulfonylamino group, and the like.

In the formula (Y-1), the alkyl sulfonyl amino group is preferably a substituted or unsubstituted alkyl sulfonyl amino group having 1 to 30 carbon atom(s). The substituent of the substituted alkyl sulfonyl amino group includes, for example, the substituents described for the substituted alkyl group. The alkyl sulfonyl amino group includes, for example, a methyl sulfonyl amino group, a butyl sulfonyl amino group, and the like.

In the formula (Y-1), the aryl sulfonyl amino group is preferably a substituted or unsubstituted aryl sulfonyl amino group having 6 to 30 carbon atoms. The substituent of the substituted aryl sulfonyl amino group includes, for example, the substituents described for the substituted alkyl group. The aryl sulfonyl amino group includes, for example, a phenyl sulfonyl amino group, a 2,3,5-trichlorophenyl sulfonyl amino group, a p-methyl phenyl sulfonyl amino group, and the like.

In the formula (Y-1), the alkyl thio group is preferably a substituted or unsubstituted alkyl thio group having 1 to 30 carbon atom(s). The substituent of the substituted alkyl thio group includes, for example, the substituents described for the substituted alkyl group. The alkyl thio group includes, for example, a methyl thio group, an ethyl thio group, a n-hexylthio group, and the like.

In the formula (Y-1), the aryl thio group is preferably a substituted or unsubstituted aryl thio group having 6 to 30 carbon atoms. The substituent of the substituted aryl thio group includes, for example, the substituents described for the substituted alkyl group. The aryl thio group includes, for example, a phenyl thio group, a p-chlorophenyl thio group, a m-methoxyphenyl thio group, and the like.

In the formula (Y-1), the heterocyclic thio group is preferably a substituted or unsubstituted heterocyclic thio group having 2 to 30 carbon atoms. The substituent of the substituted heterocyclic thio group includes, for example, the substituents described for the substituted alkyl group. The heterocyclic thio group includes, for example, a 2-benzothiazolyl thio group, a 1-phenyltetrazole-5-yl thio group, and the like.

In the formula (Y-1), the sulfamoyl group is preferably a substituted or unsubstituted sulfamoyl group having 0 to 30 carbon atoms. The substituent of the substituted sulfamoyl group includes, for example, the substituents described for the substituted alkyl group. The sulfamoyl group includes, for example, an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group, and the like.

In the formula (Y-1), the alkyl sulfinyl group is preferably a substituted or unsubstituted alkyl sulfinyl group having 1 to 30 carbon atom(s). The substituent of the substituted alkyl sulfinyl group includes, for example, the substituents described for the substituted alkyl group. The alkyl sulfinyl group includes, for example, a methyl sulfinyl group, an ethyl sulfinyl group, and the like.

In the formula (Y-1), the aryl sulfinyl group is preferably a substituted or unsubstituted aryl sulfinyl group having 6 to 30 carbon atoms. The substituent of the substituted aryl sulfinyl group includes, for example, the substituents described for the substituted alkyl group. The aryl sulfinyl group includes, for example, a phenyl sulfinyl group, a p-methyl sulfinyl group, and the like.

In the formula (Y-1), the alkyl sulfonyl group is preferably a substituted or unsubstituted alkyl sulfonyl group having 1 to 30 carbon atom(s). The substituent of the substituted alkyl sulfonyl group includes, for example, the substituents described for the substituted alkyl group. The alkyl sulfonyl group includes, for example, a methyl sulfonyl group, an ethyl sulfonyl group, and the like.

In the formula (Y-1), the aryl sulfonyl group is preferably a substituted or unsubstituted aryl sulfonyl group having 6 to 30 carbon atoms. The substituent of the substituted aryl sulfonyl group includes, for example, the substituents described for the substituted aryl sulfonyl group. The aryl sulfonyl group includes, for example, a phenyl sulfonyl group, a p-toluene sulfonyl group, and the like.

In the formula (Y-1), the acyl group is preferably a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. The substituents of the substituted alkyl carbonyl group, the substituted aryl carbonyl group, and the substituted heterocyclic carbonyl group include, for example, the substituents described for the substituted alkyl group. The acyl group includes, for example, an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group, and the like.

In the formula (Y-1), the aryloxy carbonyl group is preferably a substituted or unsubstituted aryloxy carbonyl group having 7 to 30 carbon atoms. The substituent of the substituted aryloxy carbonyl group includes, for example, the substituents described for the substituted alkyl group. The aryloxy carbonyl group includes, for example, a phenoxy carbonyl group, an o-chlorophenoxy carbonyl group, a m-nitrophenoxy carbonyl group, a p-tert-butyl phenoxy carbonyl group, and the like.

In the formula (Y-1), the alkoxy carbonyl group is preferably a substituted or unsubstituted alkoxy carbonyl group having 2 to 30 carbon atoms. The substituent of the substituted alkoxy carbonyl group includes, for example, the substituents described for the substituted alkyl group. The alkoxy carbonyl group includes, for example, a methoxy carbonyl group, an ethoxy carbonyl group, a tert-butoxy carbonyl group, a n-octadecyloxy carbonyl group, and the like.

In the formula (Y-1), the carbamoyl group is preferably a substituted or unsubstituted carbamoyl group having 1 to 30 carbon atom(s). The substituent of the substituted carbamoyl group includes, for example, the substituents described for the substituted alkyl group. The carbamoyl group includes, for example, a carbamoyl group, an N-methyl carbamoyl group, an N,N-dimethyl carbamoyl group, an N,N-di-n-octyl carbamoyl group, an N-(methylsulfonyl)carbamoyl group, and the like.

In the formula (Y-1), the phosphino group is preferably a substituted or unsubstituted phosphino group having 2 to 30 carbon atoms. The substituent of the substituted phosphino group includes, for example, the substituents described for the substituted alkyl group. The phosphino group includes, for example, a dimethyl phosphino group, a diphenyl phosphino group, a methyl phenoxy phosphino group, and the like.

In the formula (Y-1), the phosphinyl group is preferably a substituted or unsubstituted phosphinyl group having 2 to 30 carbon atoms. The substituent of the substituted phosphinyl group includes, for example, the substituents described for the substituted alkyl group. The phosphinyl group includes, for example, a phosphinyl group, a dioctyloxy phosphinyl group, a diethoxy phosphinyl group, and the like.

In the formula (Y-1), the phosphinyloxy group is preferably a substituted or unsubstituted phosphinyloxy group having 2 to 30 carbon atoms. The substituent of the substituted phosphinyloxy group includes, for example, the substituents described for the substituted alkyl group. The phosphinyloxy group includes, for example, a diphenoxy phosphinyloxy group, a dioctyloxy phosphinyloxy group, and the like.

In the formula (Y-1), the phosphinyl amino group is preferably a substituted or unsubstituted phosphinyl amino group having 2 to 30 carbon atoms. The substituent of the substituted phosphinyl amino group includes, for example, the substituents described for the substituted alkyl group. The phosphinyl amino group includes, for example, a dimethoxy phosphinyl amino group, a dimethylamino phosphinyl amino group, and the like.

In the formula (Y-1), the silyl group is preferably a substituted or unsubstituted silyl group having 3 to 30 carbon atoms. The substituent of the substituted silyl group includes, for example, the substituents described for the substituted alkyl group. The silyl group includes, for example, a trimethyl silyl group, a tert-butyldimethyl silyl group, a phenyldimethyl silyl group, and the like.

In the formula (Y-1), the azo group includes, for example, a phenyl azo group, a 4-methoxyphenyl azo group, a 4-pivaloylamino phenyl azo group, a 2-hydroxy-4-propanoyl phenyl azo group, and the like.

In the formula (Y-1), the imide group includes, for example, an N-succinimide group, an N-phthalimide group, and the like.

In the formula (Y-1), $X_1$ and $X_2$ each represent an electron attractive group, and may be identical to or different from each other. The $X_1$ and $X_2$ include, for example, an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron attractive group, a heterocyclic group, a halogen atom, an azo group, a selenocyanate group, and the like.

In the formula (Y-1), $X_1$ and $X_2$ each preferably represent an acyl group having 2 to 12 carbon atoms, an acyloxy group having 2 to 12 carbon atoms, a carbamoyl group having 1 to 12 carbon atom(s), an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atom(s), an aryl sulfinyl group having 6 to 18 carbon atoms, an alkyl sulfonyl group having 1 to 12 carbon atom(s), an aryl sulfonyl group having 6 to 18 carbon atoms, a sulfamoyl group having 0 to 12 carbon atoms, a halogenated alkyl group having 1 to 12 carbon atom(s), a halogenated alkoxy group having 1 to 12 carbon atom(s), a halogenated alkylthio group having 1 to 12 carbon atom(s), a halogenated aryloxy group having 7 to 18 carbon atoms, an aryl group having 7 to 18 carbon atoms and substituted with other two or more electron attractive groups, or a 5- to 8-membered heterocyclic group having 1 to 18 carbon atom(s) and having a nitrogen atom, an oxygen atom, or a sulfur atom.

In the formula (Y-1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other. Examples of the alkyl group, the alkenyl group, the alkynyl group, the aralkyl group, the aryl group, and the heterocyclic group are the same as those described for $R_1$, $R_2$, $Y_1$, and $Y_2$.

In the formula (Y-1), $M_1$ represents a hydrogen atom or a cation. The cation is an alkali metal ion, an ammonium ion, or a quaternary ammonium ion. The cation is preferably Li, Na, K, $NH_4$, or $NR_4$. Here, the $R_4$ represents an alkyl group or an aryl group, and examples thereof are the same as those described for $R_1$, $R_2$, $Y_1$, and $Y_2$. Among these, the cation is preferably Li, Na, K, or $NH_4$.

As for a preferred combination of the substituents of the dye represented by the formula (Y-1), at least one of various substituents is preferably one of the aforementioned preferred groups. More preferably, a larger number of various substituents are the aforementioned preferred groups. Most preferably, all of the substituents are the aforementioned preferred groups.

Particularly preferred combinations of the substituents of the dye represented by the formula (Y-1) include the following (I) to (V).

(I) $R_1$ and $R_2$ may be identical to or different from each other, and preferably represent a substituted or unsubstituted alkyl group having 1 to 12 carbon atom(s) in total, a substituted or unsubstituted aryl group having 6 to 18 carbon atoms in total, or a substituted or unsubstituted heterocyclic group having 4 to 12 carbon atoms in total. $R_1$ and $R_2$ more preferably represent a straight or branched chain alkyl group having 1 to 8 carbon atom(s) in total, still more preferably represent a secondary or tertiary alkyl group, and most preferably represent a tert-butyl group.

(II) $X_1$ and $X_2$ each represent an electron attractive group, and may be identical to or different from each other. $X_1$ and $X_2$ preferably represent a cyano group, an alkyl sulfonyl group having 1 to 12 carbon atom(s), an aryl sulfonyl group having 6 to 18 carbon atoms, or a sulfamoyl group having 0 to 12 carbon atoms. $X_1$ and $X_2$ more preferably represent a cyano group or an alkyl sulfonyl group having 1 to 12 carbon atom(s).

(III) $Y_1$ and $Y_2$ may be identical to or different from each other, and preferably represent a hydrogen atom, a substituted or unsubstituted alkyl group having 1 to 12 carbon atom(s) in total, a substituted or unsubstituted aryl group having 6 to 18 carbon atoms in total, or a substituted or unsubstituted heterocyclic group having 4 to 12 carbon atoms in total. $Y_1$ and $Y_2$ more preferably represent a hydrogen atom or a substituted or unsubstituted alkyl group. $Y_1$ and $Y_2$ most preferably represent a hydrogen atom.

(IV) $Z_1$ and $Z_2$ may be identical to or different from each other, and preferably represent a substituted or unsubstituted alkyl group having 1 to 12 carbon atom(s) in total, a substituted or unsubstituted aryl group having 6 to 18 carbon atoms in total, or a substituted or unsubstituted heterocyclic group having 4 to 12 carbon atoms in total. $Z_1$ and $Z_2$ more preferably represent a substituted or unsubstituted aryl group or a substituted or unsubstituted heterocyclic group. $Z_1$ and $Z_2$ still more preferably represent a substituted aryl group.

(V) $M_1$ preferably represents a hydrogen atom, an alkali metal ion, an ammonium ion, or a quaternary ammonium ion. $M_1$ more preferably represents a hydrogen atom, Li, Na, K, or $NH_4$.

Preferred examples of the dye (Y-1) include compounds represented by the following formulae (Y-1a) to (Y-1e).

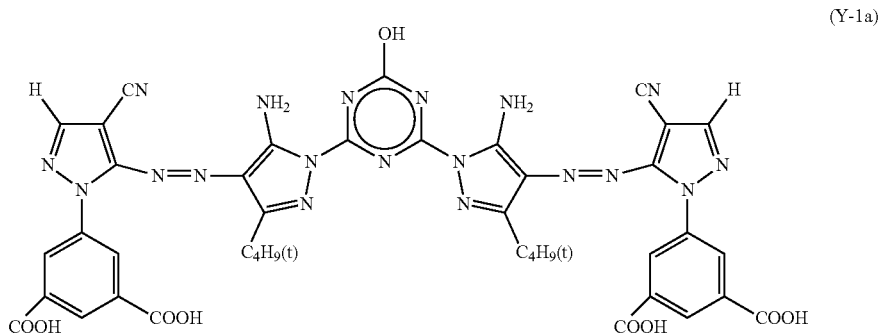

(Y-1a)

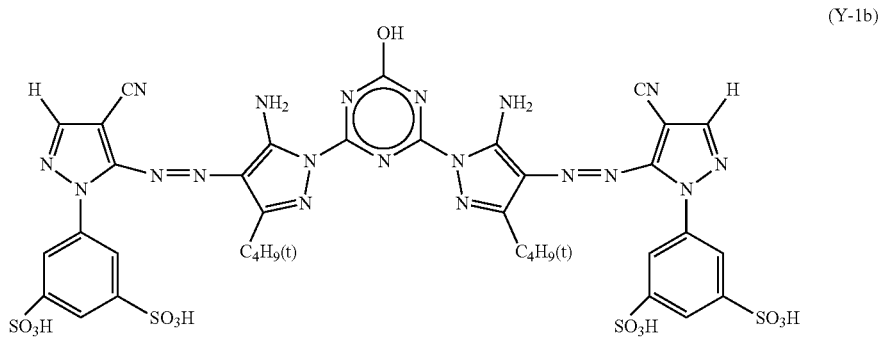

(Y-1b)

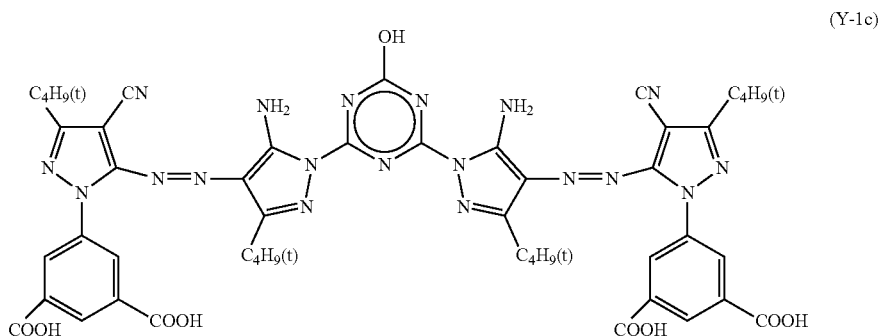

(Y-1c)

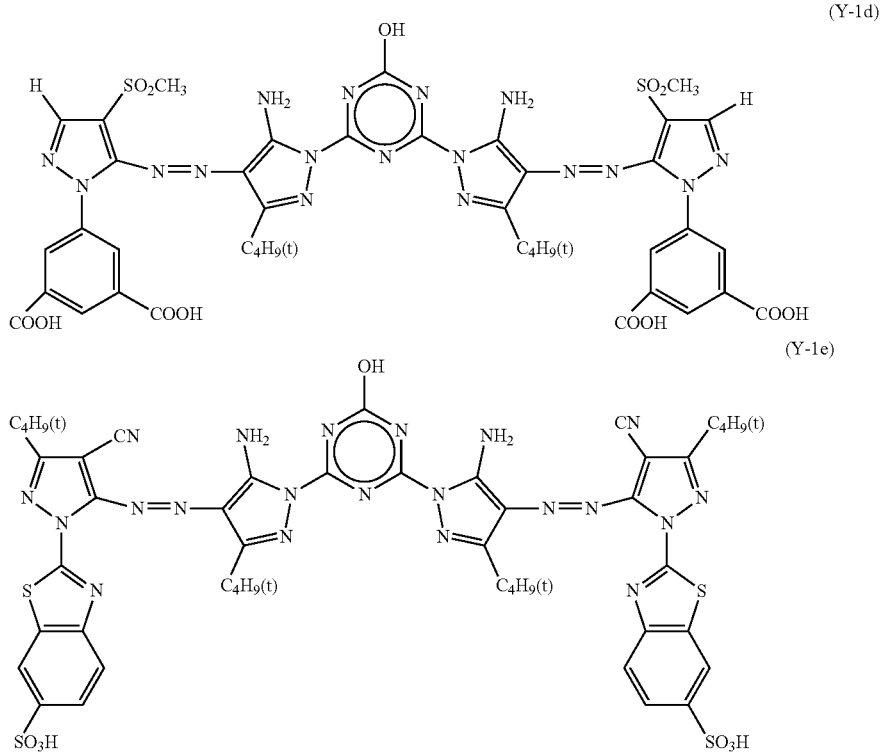

(Y-1d)

(Y-1e)

C. I. Direct Yellow 86 is a dye represented by the following formula (Y-2).

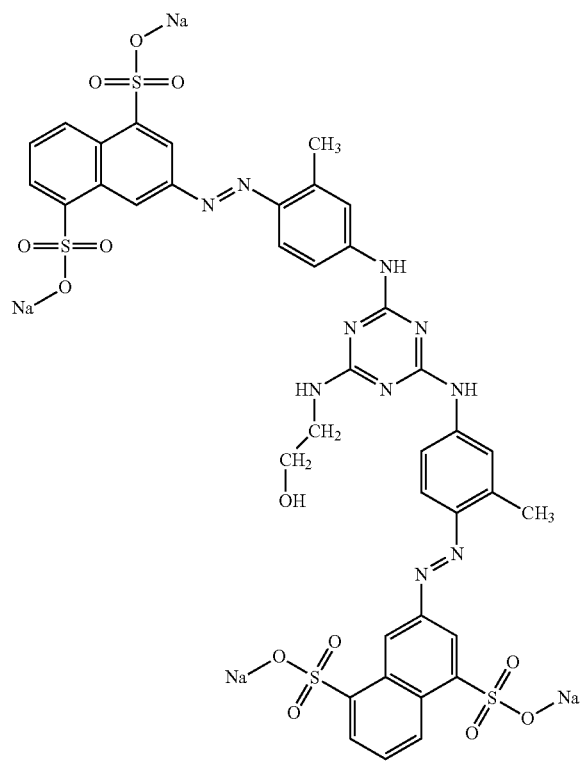

(Y-2)

In the formula (M-1), the substituted or unsubstituted alkyl group of each of $R_{18}$, $R_{19}$, and $R_{20}$ is preferably an alkyl group having 1 to 9 carbon atom(s) in total. The substituted or unsubstituted alkyl group includes, for example, a methyl group, an ethyl group, a n-propyl group, an isopropyl group, a n-butyl group, a trifluoromethyl group, a dimethylaminomethyl group, and the like. The substituent of the substituted alkyl group includes, for example, a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-1), the substituted or unsubstituted alkoxy group of each of $R_{18}$, $R_{19}$, and $R_{20}$ is preferably an alkoxy group having 1 to 9 carbon atom(s) in total. The substituted or unsubstituted alkoxy group includes, for example, a methoxy group, an isopropoxy group, a n-butoxy group, and the like.

In the formula (M-1), the halogen atom of each of $R_{18}$, $R_{19}$, and $R_{20}$ includes, for example, a fluorine atom, a chlorine atom, a bromine atom, an iodine atom, and the like.

In the formula (M-1), the substituted or unsubstituted carbamoyl group of each of $R_{18}$, $R_{19}$, and $R_{20}$ includes, for example, a carbamoyl group, an N,N-dimethylcarbamoyl group, a phenylcarbamoyl group, and the like.

In the formula (M-1), the substituted or unsubstituted sulfamoyl group of each of $R_{18}$, $R_{19}$, and $R_{20}$ includes, for example, a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the formula (M-1), the substituted or unsubstituted amino group of each of $R_{18}$, $R_{19}$, and $R_{20}$ includes, for example, an N-methylamino group, a carbamoylamino group, an N,N-diethylamino group, an acetylamino group, and the like.

In the formula (M-1), the sulfonate ester group of each of $R_{18}$, $R_{19}$, and $R_{20}$ includes, for example, a phenoxysulfonyl group and the like.

In the formula (M-1), the substituted or unsubstituted alkylsulfonyl group of each of $R_{18}$, $R_{19}$, and $R_{20}$ is preferably an alkylsulfonyl group having 1 to 9 carbon atom(s) in total. The substituted or unsubstituted alkylsulfonyl group includes, for example, a hydroxysulfonyl group and the like.

In the formula (M-1), the substituted or unsubstituted arylsulfonyl group of each of $R_{18}$, $R_{19}$, and $R_{20}$ is preferably an arylsulfonyl group having 6 to 15 carbon atoms in total. The substituted or unsubstituted arylsulfonyl group includes, for example, a benzylsulfonyl group and the like.

In the formula (M-1), the carboxylate ester group of each of $R_{18}$, $R_{19}$, and $R_{20}$ includes, for example, a methoxycarbonyl group and the like.

In the formula (M-1), the substituted or unsubstituted alkyl group of each of $R_{21}$, $R_{22}$, and $R_{23}$ is preferably an alkyl group having 1 to 18 carbon atom(s) in total. The substituted or unsubstituted alkyl group includes, for example, an ethyl group, a n-butyl group, a n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-1), the substituted or unsubstituted alkenyl group of each of $R_{21}$, $R_{22}$, and $R_{23}$ is preferably an alkenyl group having 2 to 18 carbon atoms in total. The substituted or unsubstituted alkenyl group includes, for example, a 2-methyl-1-propenyl group, a vinyl group, an allyl group, and the like.

In the formula (M-1), the substituted or unsubstituted aryl group of each of $R_{21}$, $R_{22}$, and $R_{23}$ includes, for example, a 3,4-dicarboxyphenyl group, a 4-butylphenyl group, a 4-carboxyphenyl group, and the like. The substituent of the substituted aryl group includes, for example, the substituents described for the substituted alkyl group.

In the formula (M-1), the substituted or unsubstituted aralkyl group of each of $R_{21}$, $R_{22}$, and $R_{23}$ includes, for example, a benzyl group, a 1-carboxy-2-phenyl-ethyl group, a 1-carboxy-2-hydroxyphenylethyl group, a 4-carboxybenzyl group, and the like.

In the formula (M-1), the substituted or unsubstituted alicyclic group of each of $R_{21}$, $R_{22}$, and $R_{23}$ includes, for example, a cyclohexyl group, a 4-carboxycyclohexyl group, and the like.

In the formula (M-1), the substituted or unsubstituted heterocyclic group of each of $R_{21}$, $R_{22}$, and $R_{23}$ includes, for example, a pyridyl group, a thiadiazolyl group, a benzothiazolyl group, a 2,2,6,6-tetramethylpiperidinyl group, and the like. The substituent of the substituted heterocyclic group includes, for example, the substituents described for the substituted alkyl group.

In the formula (M-1), at least one of $R_{21}$, $R_{22}$, and $R_{23}$ may be an alkyl group, an alkenyl group, an aryl group, an alicyclic group, an aralkyl group, or a heterocyclic group substituted by one to four carboxyl group(s) or sulfamoyl group(s).

In the formula (M-1), $R_{21}$ and $R_{22}$ may each be a hydrogen atom or a tri-substituted phenyl group, and may be identical to or different from each other. Here, three substituents of the tri-substituted phenyl group each are a hydrogen atom, a halogen atom, a hydroxyl group, a substituted or unsubstituted alkyl group having 1 to 9 carbon atom(s) in total, a substituted or unsubstituted alkoxy group having 1 to 9 carbon atom(s) in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

A preferred aspect of the dye represented by the formula (M-1) is, for example, an aspect wherein, in the formula (M-1), at least one of $R_{21}$, $R_{22}$, and $R_{23}$ is an alkyl group, an alkenyl group, an aryl group, an aralkyl group, or a cyclohexyl group substituted by one to four carboxyl group(s) or sulfamoyl group(s).

With respect to the dye represented by the formula (M-1), the number of sulfo groups, carboxyl groups, and/or these salts contained in its structure is preferably six or less in total, more preferably five or less in total, and much more preferably four or less in total.

A preferred aspect of the dye represented by the formula (M-1) is, for example, an aspect wherein, in the formula (M-1), r is 0;

$R_{18}$ is a carboxyl group, a carbamoyl group, a trifluoromethyl group, or a sulfamoyl group;

$R_{19}$, $R_{20}$, and $R_{22}$ each are a hydrogen atom;

$R_{21}$ is a phenyl group optionally substituted by a carboxyl group or a sulfamoyl group, or a carboxy alkyl group; and $R_{23}$ is a hydrogen atom or an alkyl group, in a case that any one of the $R_{18}$ to $R_{23}$ has an acid group or acid groups, a part of all of the acid groups may be a salt type group;

each of three Ms may be any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$.

The dye represented by the formula (M-1) can be produced by any known producing method, for example, by the producing method disclosed in U.S. Pat. No. 8,603,232.

Preferred specific examples of the dye represented by the formula (M-1) include compounds represented by the following formulae (M-1a) to (M-1e).

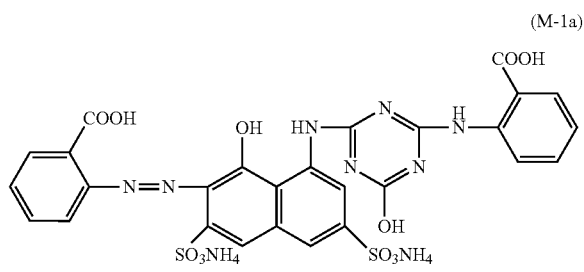

(M-1a)

The compound represented by the formula (M-1a) is an aspect wherein, in the formula (M-1), r is 0;

$R_{18}$ is a carboxyl group at the 2-position of a phenyl group bonded to an azo group;

$R_{19}$, $R_{20}$ and $R_{22}$ each are a hydrogen atom;

$R_{21}$ is a 2-carboxyphenyl group;
$R_{23}$ is a hydrogen atom; and
M is $NH_4$.

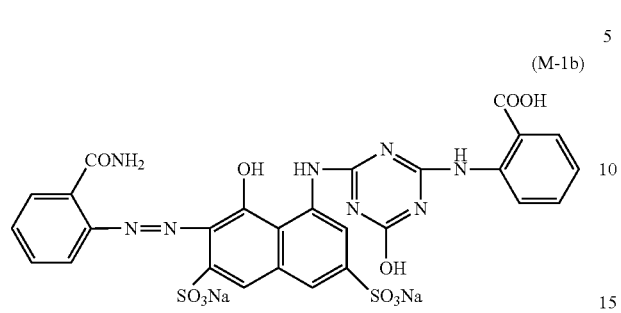
(M-1b)

The compound represented by the formula (M-1b) is an aspect wherein in the formula (M-1),
r is 0;
$R_{18}$ is a carbamoyl group at the 2-position of a phenyl group bonded to an azo group;
$R_{19}$, $R_{20}$ and $R_{22}$ each are a hydrogen atom;
$R_{21}$ is a 2-carboxyphenyl group;
$R_{23}$ is a hydrogen atom; and
M is Na.

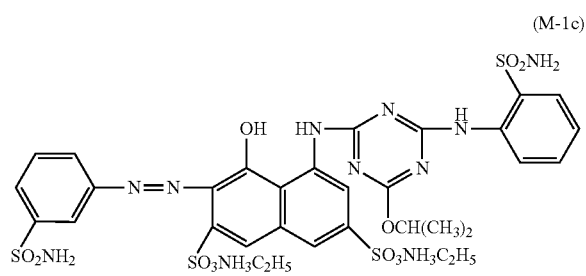
(M-1c)

The compound represented by the formula (M-1c) is an aspect wherein, in the formula (M-1),
r is 0;
$R_{18}$ is a sulfamoyl group at the 3-position of a phenyl group bonded to an azo group;
$R_{19}$, $R_{20}$ and $R_{22}$ each are a hydrogen atom;
$R_{21}$ is a 2-sulfamoylphenyl group;
$R_{23}$ is an isopropyl group; and
M is $NH_3C_2H_5$.

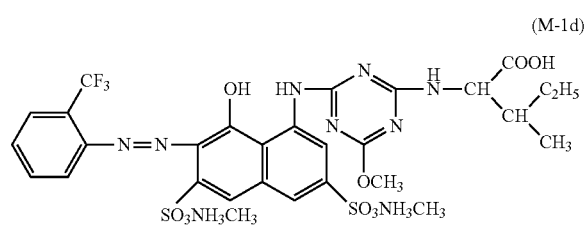
(M-1d)

The compound represented by the formula (M-1d) is an aspect wherein, in the formula (M-1),
r is 0;
$R_{18}$ is a trifluoromethyl group at the 2-position of a phenyl group bonded to an azo group;
$R_{19}$, $R_{20}$ and $R_{22}$ each are a hydrogen atom;
$R_{21}$ is a 1-carboxy-2-methylbutyl group;
$R_{23}$ is a methyl group; and
M is $NH_3CH_3$.

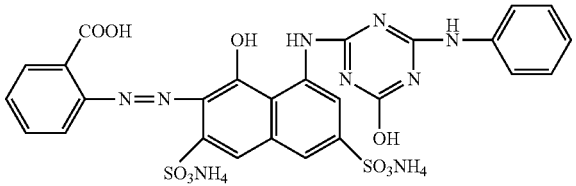
(M-1e)

The compound represented by the formula (M-1e) is an aspect wherein, in the formula (M-1),
r is 0;
$R_{18}$ is a carboxyl group at the 2-position of a phenyl group bonded to an azo group;
$R_{19}$, $R_{20}$ and $R_{22}$ each are a hydrogen atom;
$R_{21}$ is a phenyl group;
$R_{23}$ is a hydrogen atom; and
M is $NH_4$.

In the formula (M-2), the substituted or unsubstituted alkyl group is preferably an alkyl group having 1 to 6 carbon atom(s). The substituted or unsubstituted alkyl group includes, for example, a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. A substituent of the substituted alkyl group includes, for example, a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-2), the substituted or unsubstituted aryl group is preferably an aryl group having 6 to 12 carbon atoms. However, in the case of the substituted aryl group, the number of carbon atoms does not include the number of carbon atoms of its substituent(s). The substituted or unsubstituted aryl group includes, for example, a phenyl group, a naphthyl group, a p-tolyl group, a p-octylphenyl group, a mesityl group, a p-methoxyphenyl group, an o-chlorophenyl group, a m-(3-sulfopropylamino)phenyl group, and the like. The substituent of the substituted aryl group includes, for example, an alkyl group such as a methyl group, an ethyl group, an isopropyl group, a tert-butyl group, a n-octyl group, or the like; the same alkoxy group as that described above; the same halogen atom as that described above; an alkylamino group such as a methylamino group, a dimethylamino group, or the like; an amide group; a carbamoyl group; a sulfamoyl group; a sulfoamide group; a hydroxyl group; an ester group such as a methoxycarbonyl group, an ethoxycarbonyl group, or the like; the same ionic hydrophilic group as that described above; and the like.

In the formula (M-2), the halogen atom includes, for example, a fluorine atom, a chlorine atom, a bromine atom, an iodine atom, and the like.

In the formula (M-2), the substituted or unsubstituted heterocyclic group is preferably a 5- or 6-membered heterocyclic group. The substituted or unsubstituted heterocyclic group includes, for example, a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. The substituent of the substituted heterocyclic group includes, for example, an amide group, a carbamoyl group, a sulfamoyl group, a sulfoamide group, a hydroxyl group, the same ester group as that described above, the same ionic hydrophilic group as that described above, and the like.

In the formula (M-2), the substituted or unsubstituted sulfonyl group includes, for example, a methylsulfonyl group, a phenylsulfonyl group, and the like. The substituent of the substituted sulfonyl group includes, for example, the same substituted or unsubstituted alkyl group as that described above, the same substituted or unsubstituted aryl group as that described above, and the like.

In the formula (M-2), the substituted or unsubstituted acyl group is preferably an acyl group having 1 to 12 carbon atom(s). However, in the case of the substituted acyl group, the number of carbon atoms does not include the number of carbon atoms of its substituent(s). The substituted or unsubstituted acyl group includes, for example, an acetyl group, a benzoyl group, a chloroacetyl group, and the like. The substituent of the substituted acyl group includes, for example, the same ionic hydrophilic group as that described above.

As described above, in the formula (M-2), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ are both preferably carbon atoms, in view of the fact that better performance can be obtained. The substituent bonded to the carbon atoms of $A_1$ and $A_2$ includes, for example, an alkyl group having 1 to 3 carbon atom(s), a carboxyl group, a carbamoyl group, a cyano group, and the like.

As described above, in the formula (M-2), $R_{14}$ and $R_{15}$ are not both hydrogen atoms and $R_{16}$ and $R_{17}$ are not both hydrogen atoms, as well. Further, in the formula (M-2), the water solubility of the dye tends to be improved as the number of substitutions by a sulfo group or a carboxyl group is increased. Therefore, the number of these substitutions is preferably adjusted in accordance with needs.

A preferred aspect of the dye represented by the formula (M-2) is, for example, an aspect wherein, in the formula (M-2), $R_{11}$ is an alkyl group; $R_{12}$ is a cyano group; $R_{13}$ is a hydrogen atom or a substituted or unsubstituted heterocyclic group; $R_{14}$ is a hydrogen atom, a substituted or unsubstituted heterocyclic group or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

A more preferred aspect of the dye represented by the formula (M-2) is, for example, an aspect wherein, in the formula (M-2), $R_{11}$ is a tert-butyl group; $R_{12}$ is a cyano group; $R_{13}$ is a hydrogen atom or a benzothiazolyl group (preferably, a benzothiazole-2-yl group) optionally substituted by a sulfo group or an alkali metal sulfonate group; $R_{14}$ is a hydrogen atom, a benzothiazolyl group (preferably, a benzothiazole-2-yl group) optionally substituted by a sulfo group or an alkali metal sulfonate group, or a trialkylphenyl group (preferably, a mesityl group) substituted by a sulfo group or an alkali metal sulfonate group; $R_{15}$ and $R_{16}$ each are a monoalkylphenyl group, a dialkylphenyl group, or a trialkylphenyl group (preferably, a p-octylphenyl group or a mesityl group) optionally substituted by a sulfo group or an alkali metal sulfonate group or a benzothiazolyl group (preferably, a benzothiazole-2-yl group) substituted by a sulfo group or an alkali metal sulfonate group; $R_{17}$ is a hydrogen atom; $A_1$ is a carbon atom substituted by an alkyl group; and $A_2$ is a carbon atom optionally substituted by a cyano group.

The dye represented by the formula (M-2) can be produced by any known producing method, for example, by the producing method disclosed in U.S. Pat. No. 8,603,232.

Preferred specific examples of the dye represented by the formula (M-2) include compounds represented by the following formulae (M-2a) to (M-2f).

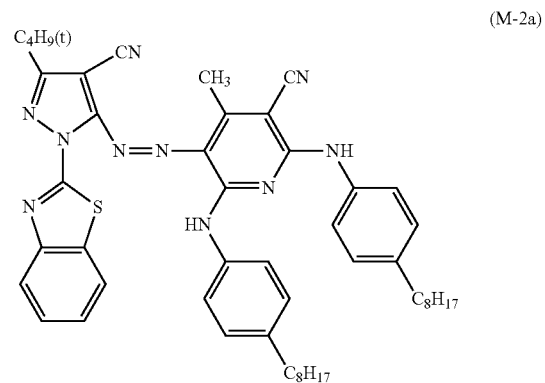

(M-2a)

The compound represented by the formula (M-2a) is a compound wherein, in the formula (M-2), $R_{11}$ is a tert-butyl group; $R_{12}$ is a cyano group; $R_{13}$ is a benzothiazole-2-yl group; $R_{14}$ is a hydrogen atom; $R_{15}$ and $R_{16}$ each are a p-octylphenyl group; $R_{17}$ is a hydrogen atom; $A_1$ is a carbon atom substituted by a methyl group; and $A_2$ is a carbon atom substituted by a cyano group.

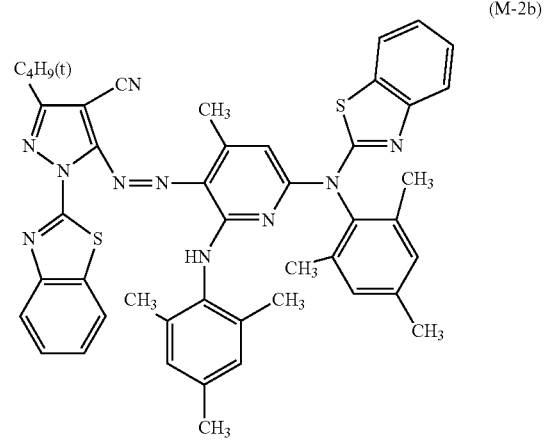

(M-2b)

The compound represented by the formula (M-2b) is a compound wherein, in the formula (M-2), $R_{11}$ is a tert-butyl group; $R_{12}$ is a cyano group; $R_{13}$ and $R_{14}$ each are a benzothiazole-2-yl group; $R_{15}$ and $R_{16}$ each are a mesityl group; $R_{17}$ is a hydrogen atom; $A_1$ is a carbon atom substituted by a methyl group; and $A_2$ is a carbon atom.

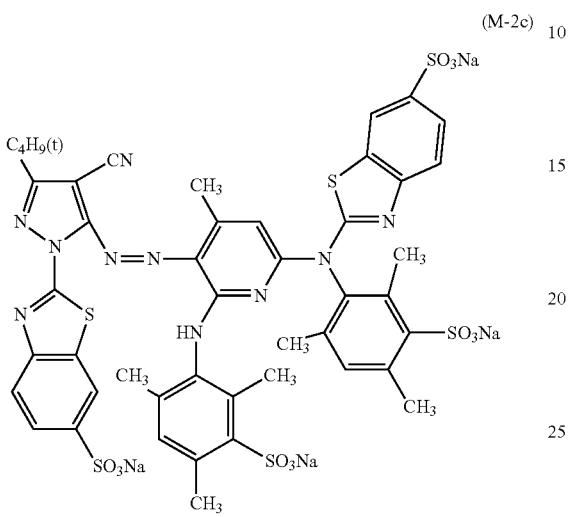

(M-2c)

The compound represented by the formula (M-2c) is a compound wherein, in the formula (M-2), $R_{11}$ is a tert-butyl group; $R_{12}$ is a cyano group; $R_{13}$ and $R_{14}$ each are a 6-sodium sulfonate benzothiazole-2-yl group; $R_{15}$ and $R_{16}$ each are a 3-sodium sulfonate mesityl group; $R_{17}$ is a hydrogen atom; $A_1$ is a carbon atom substituted by a methyl group; and $A_2$ is a carbon atom.

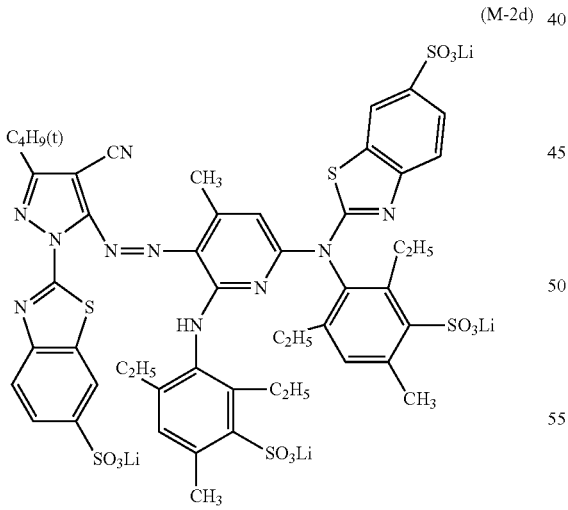

(M-2d)

The compound represented by the formula (M-2d) is a compound wherein, in the formula (M-2), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-methyl-3-lithium sulfonate phenyl group; $R_{17}$ is a hydrogen atom; $A_1$ is a carbon atom substituted by a methyl group; and $A_2$ is a carbon atom.

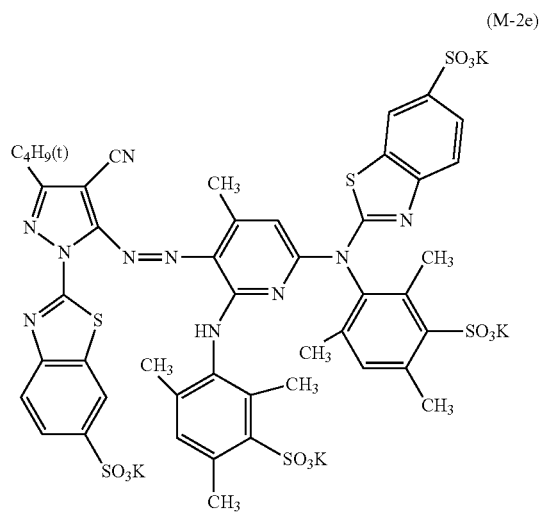

(M-2e)

The compound represented by the formula (M-2e) is a compound wherein, in the formula (M-2), $R_{11}$ is a tert-butyl group; $R_{12}$ is a cyano group; $R_{13}$ and $R_{14}$ each are a 6-potassium sulfonate benzothiazole-2-yl group; $R_{15}$ and $R_{16}$ each are a 3-potassium sulfonate mesityl group; $R_{17}$ is a hydrogen atom; $A_1$ is a carbon atom substituted by a methyl group; and $A_2$ is a carbon atom.

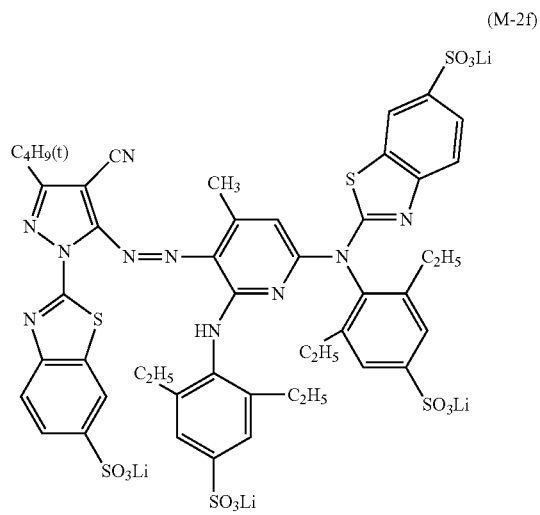

(M-2f)

The compound represented by the formula (M-2f) is a compound wherein, in the formula (M-2), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-lithium sulfonate phenyl group; $R_{17}$ is a hydrogen atom; $A_1$ is a carbon atom substituted by a methyl group; and $A_2$ is a carbon atom.

In a case that the dye represented by the above-described formula (Y-1), C.I. Direct Yellow 86, the dye represented by the formula (M-1) or the dye represented by the formula (M-2) is used as the dye, the water resistance of the printed matter is further improved. Further, the effect of suppressing the generation of deposit in the water-based ink is further enhanced; and for example, even in a case that a part or portion of a solvent of the water-based ink is evaporated, the generation of deposit in the water-based ink can be suppressed. Although the reason for this is not certain, it is presumed as follows. Namely, the dye represented by the above-described formula (Y-1), etc., has a relatively large number of the nitrogen atom in the chemical structure thereof. The nitrogen atom in the chemical structure of the dye has any interaction with the compound represented by the formula (1). With this, the probability that the compound represented by the formula (1) is present in the vicinity of the dye is high, which in turn is presumed to increase the water resistance of the printed matter and to improve the effect of suppressing the generation of deposit in the water-based ink. The dye preferably has not less than 7 (seven) nitrogen atoms in the chemical structure thereof. Although the upper limit of the number of nitrogen atoms contained in the chemical structure is not particularly limited, the number of nitrogen atoms is, for example, not more than 21 (twenty-one).

In the embodiment, it is allowable to use, as the dye, a dye which is different from the dye represented by the above-described formula (Y-1), C.I. Direct Yellow 86, the dye represented by the above-described formula (M-1) and the dye represented by the above-described formula (M-2). Alternatively, it is allowable that any different dye from the dye represented by the above-described formula (Y-1), C.I. Direct Yellow 86, the dye represented by the above-described formula (M-1) and the dye represented by the above-described formula (M-2) are not used. Such a different dye can be exemplified, for example, by direct dye, acid dye, basic dye, reactive dye, etc. The specific examples of the dye may be exemplified, for example, by C.I. Direct Black, C.I. Direct Blue, C.I. Direct Red, C.I. Direct Yellow, C.I. Direct Orange, C.I. Direct Violet, C.I. Direct Brown, C.I. Direct Green; C.I. Acid Black, C.I. Acid Blue, C.I. Acid Red, C.I. Acid Yellow, C.I. Acid Orange, C.I. Acid Violet; C.I. Basic Black, C.I. Basic Blue, C.I. Basic Red, C.I. Basic Violet; C.I. Food Black; etc. The C.I. Direct Black is exemplified, for example, by C. I. Direct Black 17, 19, 32, 51, 71, 108, 146, 154, 168, etc. The C.I. Direct Blue is exemplified, for example, by C. I. Direct Blue 6, 22, 25, 71, 86, 90, 106, 199, etc. The C.I. Direct Red is exemplified, for example, by C. I. Direct Red 1, 4, 17, 28, 83, 227, etc. The C.I. Direct Yellow is exemplified, for example, by C.I. Direct Yellow 12, 24, 26, 98, 132, 142, 173, etc. The C.I. Direct Orange is exemplified, for example, by C. I. Direct Orange 34, 39, 44, 46, 60, etc. The C.I. Direct Violet is exemplified, for example, by C. I. Direct Violet 47, 48, etc.

The C.I. Direct Brown is exemplified, for example, by C. I. Direct Brown 109, etc. The C.I. Direct Green is exemplified, for example, by C. I. Direct Green 59, etc. The C.I. Acid Black is exemplified, for example, by C. I. Acid Black 2, 7, 24, 26, 31, 52, 63, 112, 118, etc. The C.I. Acid Blue is exemplified, for example, by C. I. Acid Blue 9, 22, 40, 59, 90, 93, 102, 104, 117, 120, 167, 229, 234, etc. The C.I. Acid Red is exemplified, for example, by C. I. Acid Red 1, 6, 32, 37, 51, 52, 80, 85, 87, 92, 94, 115, 180, 256, 289, 315, 317, etc. The C.I. Acid Yellow is exemplified, for example, by C. I. Acid Yellow 11, 17, 23, 25, 29, 42, 61, 71, etc. The C.I. Acid Orange is exemplified, for example, by C. I. Acid Orange 7, 19, etc. The C.I. Acid Violet is exemplified, for example, by C. I. Acid Violet 49, etc. The C.I. Basic Black is exemplified, for example, by C.I. Basic Black 2, etc. The C.I. Basic Blue is exemplified, for example, by C.I. Basic Blue 1, 3, 5, 7, 9, 24, 25, 26, 28, 29, etc. The C.I. Basic Red is exemplified, for example, by C. I. Basic Red 1, 2, 9, 12, 13, 14, 37, etc. The C.I. Basic Violet is exemplified, for example, by C. I. Basic Violet 7, 14, 27, etc. The C.I. Food Black is exemplified, for example, by C. I. Food Black 1, 2, etc.

Further, in the embodiment, it is allowable to use, as the dye, a dye resented by the following formula (C-1).

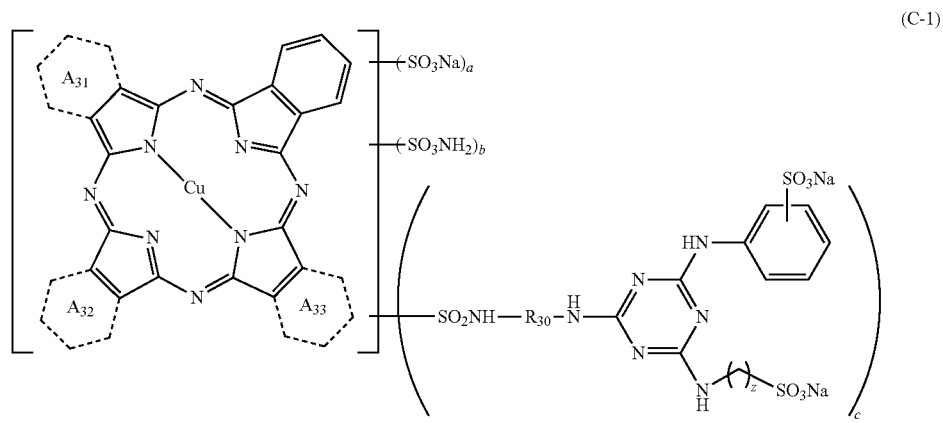

(C-1)

In the formula (C-1), each of rings $A_{31}$, $A_{32}$, and $A_{33}$ is at least one selected from the group consisting of: a benzene ring, a 2,3-pyridine ring and a 3,2-pyridine ring, and at least one of the rings $A_{31}$, $A_{32}$, and $A_{33}$ is the 2,3-pyridine ring or the 3,2-pyridine ring;

the rings $A_{31}$, $A_{32}$, and $A_{33}$ may be identical to or different from each other;

a satisfies $0 \leq a \leq 4$, b satisfies $0 \leq b \leq 4$, c satisfies $0 \leq c \leq 4$, and a, b and c satisfies $0 \leq a+b+c \leq 4$;

z is an integer satisfying $1 \leq z \leq 3$; and $R_{30}$ is a straight chain alkyl group having 1 to 6 carbon atom(s).

The compound represented by the formula (C-1) may be a compound wherein all of the rings $A_{31}$, $A_{32}$, and $A_{33}$ are the 2,3-pyridine ring or the 3,2-pyridine ring; may be a compound wherein two of the rings $A_{31}$, $A_{32}$, and $A_{33}$ are the 2,3-pyridine ring or the 3,2-pyridine ring, and the remaining one is the benzene ring; or may be a compound wherein one of the rings $A_{31}$, $A_{32}$, and $A_{33}$ are the 2,3-pyridine ring or the 3,2-pyridine ring, and the remaining two are the benzene ring. The dye represented by the formula (C-1) may be composed of a single one of the above-described compounds, or may be a mixture containing two or more kinds of the above-described compounds.

The dye represented by the formula (C-1) can be produced by any known producing method, for example, by the producing method disclosed in U.S. Pat. No. 8,603,232.

Preferred specific Examples of the dye represented by the formula (C-1) include compounds represented by the following formulae (C-1a) to (C-1f).

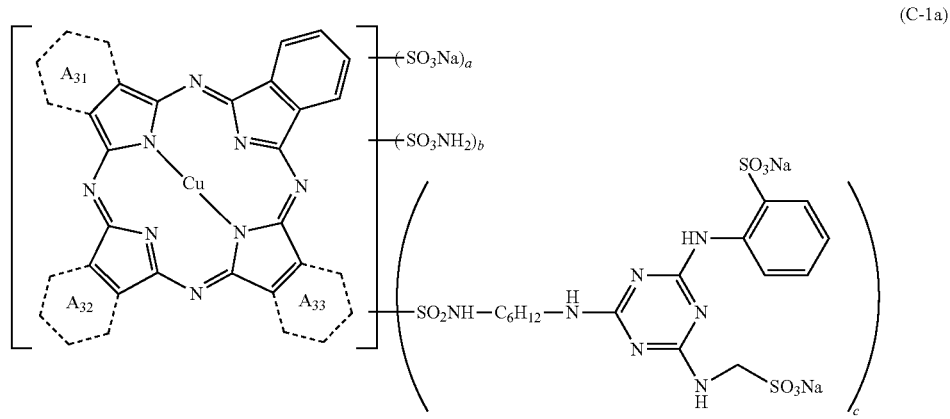
(C-1a)

In the formula (C-1a), rings $A_{31}$, $A_{32}$, and $A_{33}$ each independently represent a 2,3-pyridine ring or a 3,2-pyridine ring; a is 1.0; b is 1.8; c is 1.2; and a, b, and c are average values in a mixture.

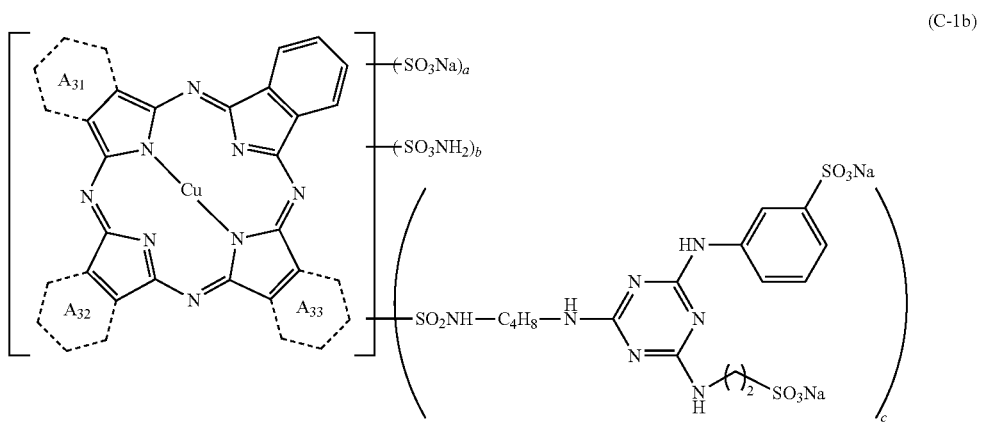
(C-1b)

In the formula (C-1b), rings $A_{31}$ and $A_{32}$ each independently represent a 2,3-pyridine ring or a 3,2-pyridine ring; a ring $A_{33}$ represents a benzene ring; a is 2.4; b is 0.6; c is 1.0; and a, b, and c are average values in a mixture.

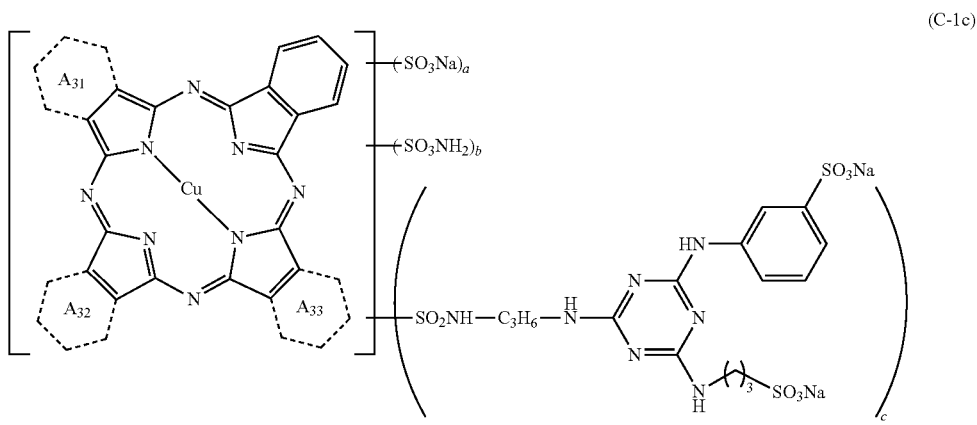
(C-1c)

In the formula (C-1c), rings $A_{31}$, $A_{32}$, and $A_{33}$ each independently represent a 2,3-pyridine ring or a 3,2-pyridine ring; a is 3.0; b is 0.2; c is 0.8; and a, b, and c are average values in a mixture.

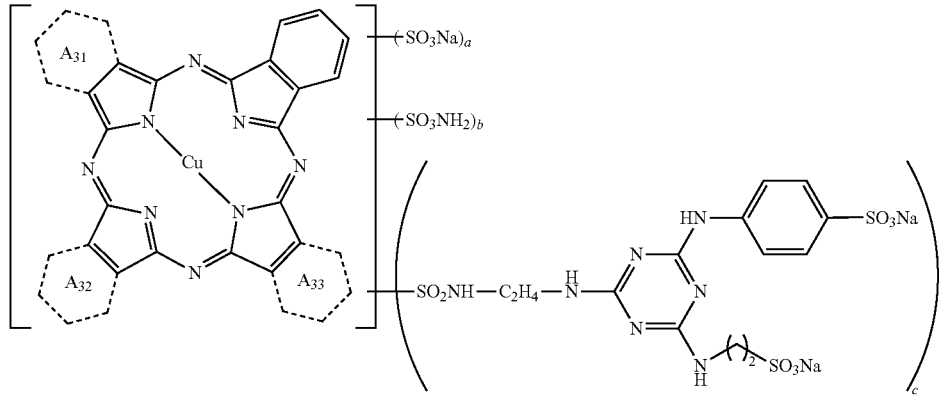
(C-1d)

In the formula (C-1d), a ring $A_{31}$ represents a benzene ring; rings $A_{32}$ and $A_{33}$ each independently represent a 2,3-pyridine ring or a 3,2-pyridine ring; a is 1.8; b is 0.9; c is 1.3; and a, b, and c are average values in a mixture.

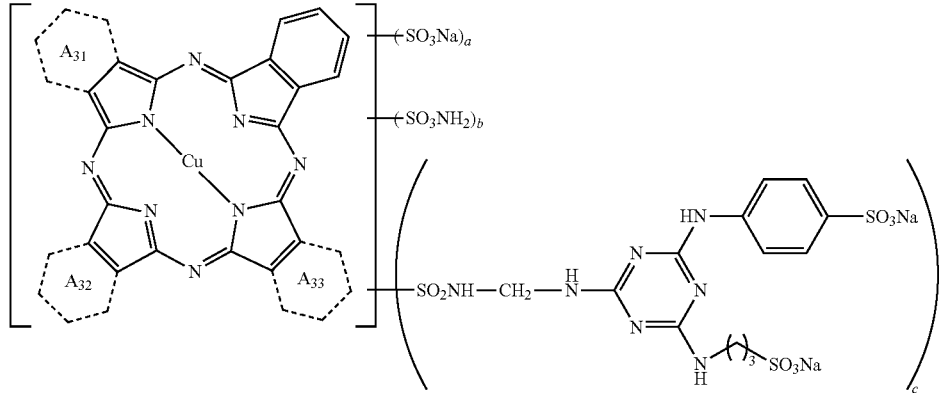
(C-1e)

In the formula (C-1e), rings $A_{31}$, $A_{32}$, and $A_{33}$ each independently represent a 2,3-pyridine ring or a 3,2-pyridine ring; a is 1.1; b is 1.3; c is 1.6; and a, b, and c are average values in a mixture.

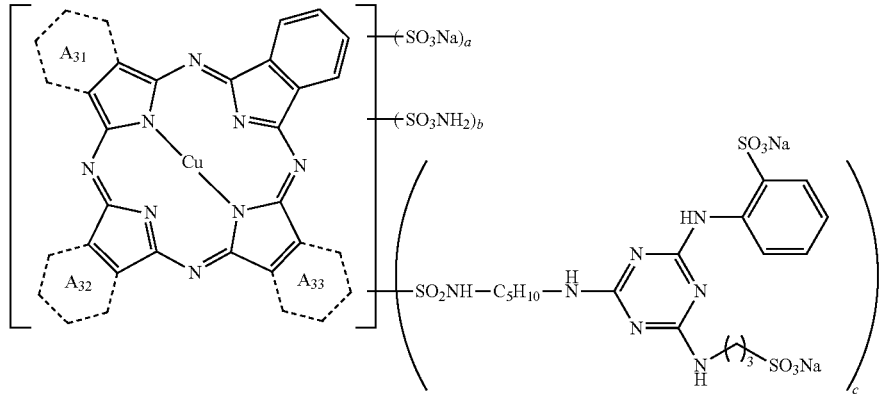
(C-1f)

In the formula (C-1f), rings $A_{31}$ and $A_{33}$ each independently represent a 2,3-pyridine ring or a 3,2-pyridine ring; a ring $A_{32}$ represents a benzene ring; a is 0; b is 1.8; c is 2.2; and a, b, and c are average values in a mixture.

It is allowable to use a single kind of the dye, or two or more kinds of the dye in combination. Further, it is allowable that the water-based ink of the embodiment contains another colorant such as a pigment, in addition to the dye, or that the water-based ink does not contain any other colorant such as a pigment, in addition to the dye. Note that, however, it is preferred that the colorant is composed only of the dye, in view of the improvement in the chromaticness of a printed matter (printed article). Further, from the viewpoint of improving the water resistance of the printed matter and of suppressing the generation of deposit in the water-based ink, the main component of the colorant is preferably the dye represented by the formula (Y-1), C.I. Direct Yellow 86, the dye represented by the formula (M-1) or the dye represented by the formula (M-2). In the water-based ink of the present embodiment, the ratio of the dye represented by the formula (Y-1), C.I. Direct Yellow 86, the dye represented by the formula (M-1) or the dye represented by the formula (M-2), with respect to the colorant, may be, for example, in a range of 90% by weight to 100% by weight, or in a range of 95% by weight to 100% by weight.

The blending amount of the dye with respect to (in) the entire amount of the water-based ink is not particularly limited. The blending amount of the dye with respect to the entire amount of the water-based ink is, for example, in a range of 0.1% by weight to 20% by weight, preferably in a range of 0.3% by weight to 20% by weight, more preferably in a range of 0.7% by weight to 12% by weight.

Next, an explanation will be given about the compound represented by the following formula (1).

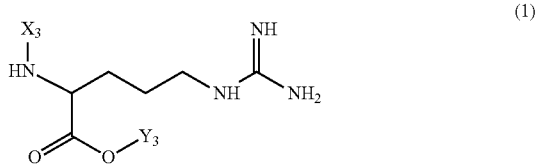

(1)

Regarding $X_3$ and $Y_3$ in the formula (1), $X_3$ represents a group represented by the following formula (2) and $Y_3$ represents a hydrogen atom, or $X_3$ represents a group represented by the following formula (3) and $Y_3$ is an ethyl group.

(2)

In the formula (2), $R_3$ represents a straight-chain or branched-chain alkyl group having 12 to 14 carbons.

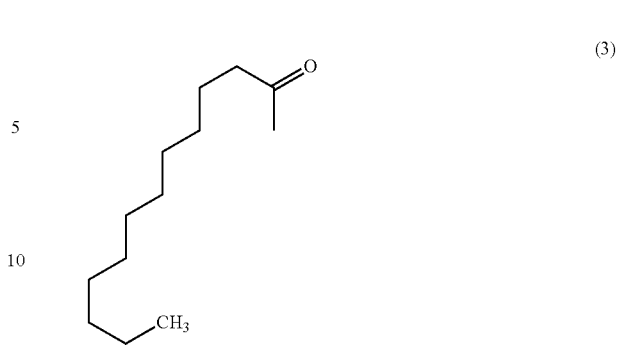

(3)

In a case that in the formula (1), $X_3$ represents the group represented by the formula (2) and $Y_3$ represents the hydrogen atom, the compound represented by the formula (1) is a compound represented by the following formula (1-A).

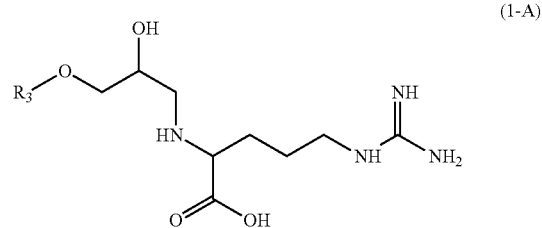

(1-A)

In the formula (1-A), $R_3$ represents a straight-chain or branched-chain alkyl group having 12 to 14 carbons.

In a case that in the formula (1), $X_3$ represents the group represented by the formula (3) and $Y_3$ is the ethyl group, the compound represented by the formula (1) is a compound represented by the following formula (1-B).

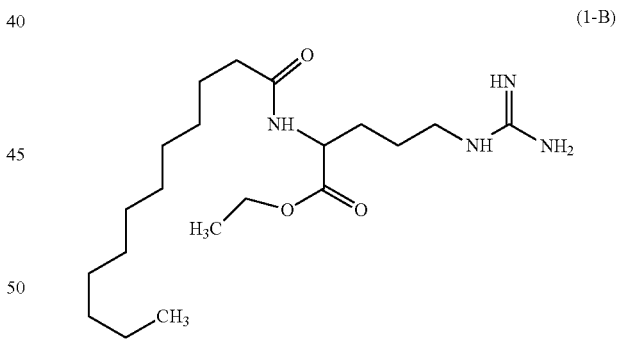

(1-B)

A guanidino group ($H_2N$—(C=NH)—NH—) in the compound represented by the formula (1) may be neutralized. Further, it is allowable that the guanidino groups in all the compounds represented by the formula (1) in the water-based ink may be neutralized, or that the guanidino group in a part of the compounds represented by the formula (1) in the water-based ink may be neutralized. Although a compound neutralizing the guanidino group is not particularly limited, such a compound is, for example, an acid exemplified by hydrochloric acid, and pyrrolidone carboxylic acid represented by the following formula (4). In particular, the guanidino group in the compound represented by the formula (1-A) is preferably neutralized by the hydrochloric acid; and the guanidino group in the compound represented by the formula (1-B) is preferably neutralized by the pyrrolidone carboxylic acid represented by the formula (4).

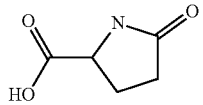
(4)

By containing the dye and the compound represented by the formula (1), the water-based ink for ink-jet recording of the present embodiment increases the water resistance of the printed matter, and is also capable of suppressing the generation of deposit in the water-based ink. The mechanism therefor is presumed as follows. Namely, the compound represented by the formula (1) is an arginine derivative including an arginine skeleton and the group represented by the $X_3$ and the group represented by $Y_3$. The guanidino group ($H_2N$—(C=NH)—NH—) which is included in the arginine skeleton and which is a cationic group is highly effective in allowing the dye to aggregate in the printed matter. Further, the $X_3$ in the formula (1) includes a hydrophobic portion composed of a relatively long alkyl group having 11 to 14 carbon atoms, and a negatively-charged hydrophilic portion including a hydroxyl group, a carbonyl group or an ether bond. Due to the hydrophobic portion of the $X_3$, the compound represented by the formula (1) easily penetrates into a recording medium such as paper which is hydrophobic, and adsorbs to the recording medium. The compound represented by the formula (1) allows the dye to aggregate, penetrates into the recording medium together with the dye, and adsorbs to the recording medium. With this, the water resistance of the printed matter is enhanced, and for example, even in a case that the printed matter is immersed into water, the dye is hardly detached (removed) from the printed matter and is hardly dissolved into the water. Further, the hydrophilic portion of the $X_3$ improves the solvability of the compound represented in the formula (1) in the water-based ink, and prohibits the compound from bonding with the dye and from aggregating. With this, the generation of deposit (precipitate) composed of the compound represented by the formula (1) and the dye in the water-based ink can be suppressed. This mechanism, however, is merely an assumption, and the present teaching is not limited to or restricted by this presumed mechanism.

The compound represented by the formula (1) may be only either one of the compound represented by the formula (1-A) and the compound represented by the formula (1-B), or may be a mixture of the compound represented by the formula (1-A) and the compound represented by the formula (1-B). Note that, however, the compound represented by the formula (1-A) is more preferred since the compound represented by the formula (1-A) has higher effects of improving the water resistance of the printed matter and of suppressing the generation of deposit in the water-based ink, as compared with the compound represented by the formula (1-B). The reason therefor is presumed as follows. Namely, the formula (1-A) includes, as the $X_3$ in the formula (1), the group represented by the formula (2), and the formula (1-B) includes, as the $X_3$ in the formula (1), the group represented by the formula (3). When comparing the formula (2) and the formula (3), the formula (2) has a longer alkyl group, and thus has the hydrophobic portion having a stronger hydrophobicity. Further, the hydrophilic portion of the formula (2) is composed of the hydroxyl group and the ether bond, whereas the hydrophilic portion of the formula (3) is composed only of the carbonyl group, and thus the formula (2) has the hydrophilic portion having a stronger hydrophilicity. Accordingly, as compared with the compound represented by the formula (1-B), the compound represented by the formula (1-A) has the hydrophobic group with the stronger hydrophobicity, and the hydrophilic group with the stronger hydrophilicity. Therefore, it is presumed that the compound represented by the formula (1-A) penetrates into and adsorbs to the recording medium such as paper, etc., more easily as compared with the compound represented by the formula (1-B), and that the compound represented by the formula (1-A) is dissolved into the water-based ink more easily as compared with the compound represented by the formula (1-B) and thus the compound represented by the formula (1-A) further suppresses the generation of deposit. Note that, however, this mechanism is merely a presumption, and the present teaching is not limited to or restricted by this presumed mechanism.

The blending amount of the compound represented by the formula (1) with respect to the entire amount of the water-based ink is, for example, in a range of 0.3% by weight to 3.0% by weight, in a range of 1.0% by weight to 3.0% by weight, in a range of 0.3% by weight to 2.0% by weight; is preferably in a range of 0.5% by weight to 2.0% by weight; and is more preferably in a range of 1.0% by weight to 2.0% by weight. In a case that the blending amount of the compound represented by the formula (1) is within the above-described range, the effect of improving the water resistance of the printed matter and/or the effect of suppressing the generation of deposit in the water-based ink is/are further improved. Since the effect of suppressing the generation of deposit is further improved, even in a case, for example, that a portion of the solvent in the water-based ink is evaporated, the generation of deposit in the water-based ink can be suppressed. In a case that the blending amount of the compound represented by the formula (1) is less than the above-described range, there is such a fear that the water resistance of the printed matter might be lowered as compared with that within the above-described range; in a case that the blending amount of the compound represented by the formula (1) is more than the above-described range, there is such a fear that the effect of suppressing the generation of deposit in the water-based ink might be lowered as compared with that within the above-described range. The blending amount of the compound represented by the formula (1) with respect to the entire amount of the water-based ink is preferably not less than 0.5% by weight in view of improving the water resistance of the printed matter, and is preferably not more than 2.0% by weight in view of suppressing the generation of deposit in the water-based ink.

In order to suppress the generation of the deposit in the water-based ink, as well as to enhance the water resistance of the printed matter, the balance between the blending amount of the dye and the blending amount of the compound represented by the formula (1) is important. The ratio (D/A) of the blending amount of the dye (D: % by weight) to the blending amount of the compound (A: % by weight) represented by the formula (1) is, for example, in a range of 1.0 to 10.0, in a range of 1.0 to 3.0, in a range of 1.5 to 10.0; is preferably in a range of 1.5 to 6.0; and is more preferably in a range of 1.5 to 3.0. In a case that the ratio (D/A) is within this range, the effect of improving the water resistance of the printed matter and/or the effect of suppressing the generation of deposit in the water-based ink are/is further improved. Since the effect of suppressing the generation of deposit is further improved, even in a case, for example, that a portion of the solvent in the water-based ink is evaporated, the generation of deposit in the water-based ink can be suppressed. In a case that the ratio (D/A) is less than the above-described range, there is such a fear that the effect of suppressing the generation of deposit in the water-based ink might be lowered as compared with that within the above-described range; in a case that the ratio (D/A) is more than the above-described range, there is such a fear that the water resistance of the printed matter might be lowered, as compared with that within the above-described range. The ratio (D/A) is preferably not less than 1.5 in view of suppressing the generation of deposit in the water-based ink and is preferably not more than 6.0 in view of improving the water resistance of the printed matter.

The water contained in the water-based ink is preferably ion-exchange water or purified water (pure water). The blending amount of the water with respect to the entire amount of the water-based ink (water ratio) is determined appropriately in accordance with a desired ink characteristic, etc. The water ratio may be, for example, a balance of the other components.

The water-based ink preferably further contains a water-soluble organic solvent. The water-soluble organic solvent is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant in the entire amount of the water-based ink is, for example, in a range of 0% by weight to 95% by weight, preferably in a range of 5% by weight to 80% by weight, or more preferably in a range of 5% by weight to 50% by weight.

The penetrant is not particularly limited, and is exemplified, for example, by glycol ether. The glycol ether is not particularly limited, and is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more kinds of the penetrant may be used in combination.

The blending amount of the penetrant in the entire amount of the water-based ink is, for example, in a range of 0% by weight to 20% by weight, preferably in a range of 0% by weight to 15% by weight, or more preferably in a range of 1% by weight to 4% by weight.

The water-based ink may further contain a variety of kind of additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble polymer, etc.

The water-based ink can be prepared, for example, by uniformly mixing the dye, the compound represented by the formula (1), water, and optionally other additive(s) as necessary, by a known method, and then removing any non-dissolved matter, etc., with a filter, etc.

With the water-based ink for ink-jet recording related to the present teaching contains the dye, the compound represented by the formula (1) and the water. With this, the water resistance of the printed matter is improved, and further the generation of any deposit in the water-based ink can be suppressed.

Next, an ink cartridge (an example of an ink container) of an embodiment related to the present teaching will be explained. The ink cartridge of the embodiment is characterized by being an ink cartridge containing a water-based ink for ink-jet recording; wherein the water-based ink is the water-based ink for ink-jet recording of the embodiment as described above. Namely, the ink cartridge (ink container) related to the present embodiment contains the water-based ink for ink-jet recording of the above-described embodiment in the inside thereof. Any known main body (body) of an ink cartridge can be used as the main body of the ink cartridge of the embodiment.

Next, explanation will be given about an ink-jet recording apparatus and an ink-jet recording method of embodiments, respectively, related to the present teaching.

The ink-jet recording method of the embodiment is an ink-jet recording method characterized by including: performing recording on a recording medium by discharging (jetting), to the recording medium, a water-based ink for ink-jet recording by an ink-jet system; and using the water-based ink for ink-jet recording of the embodiment as described above, as the water-based ink. The ink-jet recording method of the embodiment can be practiced, for example, by using a known ink-jet recording apparatus. The recording includes printing a letter (text), printing an image, printing, etc. In the ink-jet recording method of the embodiment, the water resistance of a printed matter (printed article) is improved, and the generation of deposit in the water-based ink can be suppressed. Further, since the water resistance of the printed matter is improved, the recording medium is not limited to paper; for example, it is possible to use, as the recording medium, cloth for which washing or cleaning is (to be) required.

The ink-jet recording apparatus of the embodiment is an ink-jet recording apparatus characterized by including: an ink accommodating section configured to accommodate an ink therein; and an ink discharge mechanism (ink-jet head)

configured to discharge the ink accommodated in the ink accommodating section; wherein the ink accommodated in the ink accommodating section is the water-based ink for ink-jet recording of the embodiment described above.

The FIGURE depicts the configuration of an example of the ink-jet recording apparatus of the embodiment. As depicted in the FIGURE, an ink-jet recording apparatus 1 of the embodiment includes four ink cartridges (ink containers) 2, an ink discharge mechanism (ink-jet head) 3, a head unit 4, a carriage 5, a driving unit 6, a platen roller 7 and a purge device 8 as main constitutive components or parts.

The four ink cartridges 2 contain water-based inks of four colors, respectively, the four colors being yellow, magenta, cyan and black. At least one water-based ink among the four color water-based inks is the water-based ink for ink-jet recording of the above-described embodiment. In the FIGURE, a set of the four ink cartridges 2 is depicted. However, it is allowable to use an integrated ink cartridge of which interior (inner part) is partitioned so as to form an accommodating section for the water-based yellow ink, an accommodating section for the water-based magenta ink, an accommodating section for the water-based cyan ink and an accommodating section for the water-based black ink, instead of using the set of the four ink cartridges 2. As the body of the ink cartridge of the present embodiment, for example, a publicly known body can be used.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges (ink containers) 2 are provided, together with the head unit 4, on one carriage 5. However, the present embodiment is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use, as the ink container(s), four ink bottles having a bottle shape, instead of using the four ink cartridges 2. In such a case, it is preferred that each of the ink bottles is provided with an inlet port via which the ink is poured from the outside to the inside of the ink bottle.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. In the FIGURE, the paper feeding mechanism and paper discharge mechanism for the recording paper P are omitted in the drawing.

In the apparatus depicted in the FIGURE, an ink-jet head of serial type (serial type ink-jet head) is adopted. However, the present embodiment is not limited to this. The ink-jet recording apparatus may be an apparatus adopting an ink-jet head of line type (line type ink-jet head).

EXAMPLES

Next, examples related to the present teaching will be explained together with comparative examples. Note that the present teaching is not limited to and is not restricted by the examples and the comparative examples which will be described below.

Examples 1 to 14 and Comparative Examples 1 to 6

Components in Water-based Ink Composition (TABLES 1 to 4) as indicated below were mixed uniformly or homogeneously; and thus a mixture was obtained. Subsequently, the obtained mixture was filtrated through a cellulose acetate membrane filter (pore size 3.00 μm) produced by TOYO ROSHI KAISHA, LTD., and thus a water-based ink for ink-jet recording of each of Examples 1 to 14, Comparative Examples 1 to 6 and Reference Examples 1 to 9 was obtained.

With respect to the water-based inks of Examples 1 to 14 and Comparative Examples 1 to 6, respectively, (1) Evaluation of water resistance of printed matter and (2) Evaluation of deposit in water-based ink, by the following methods. The results of the evaluations are indicated in TABLES 1 to 3.

(1) Evaluation of Water Resistance of Printed Matter

An ink-jet printer "MFC-J4510N" manufactured by BROTHER KOGYO KABUSHIKI KAISHA was used to record a solid image (an image of single color patch) on a plain paper ("Recycled Supreme" produced by XEROX CORPORATION), under the conditions with a resolution of 600 dpi×300 dpi, by using each of the water-based inks of Examples 1 to 14, Comparative Examples 1 to 6 and Reference Examples 1 to 9. Thus, evaluation samples were produced. The produced evaluation samples were immersed into water for five minutes, and then were taken out of the water, followed by being naturally dried for one day. Before and after the immersion into water, the optical density (OD value) was measured at three locations (portions) in each of the evaluation samples by using a spectrophotometric colorimetry meter "SpectroEye" (light source: $D_{50}$; field: 2°; density reference: ANSI-T) manufactured by X-RITE INC., and an average value of the optical density in the three locations was obtained.

Regarding the evaluation sample of each of Examples 1 to 14, Comparative Examples 1 to 6 and Reference Examples 1 to 9, the rate of change in the optical density (ODc) before and after the immersion into water was obtained by the following expression.

$$ODc=(ODa-ODb)/ODb \times 100$$

In the expression,
ODc: the rate of change in the optical density (%)
ODa: the average value of the optical density of the evaluation sample after the immersion into water
ODb: the average value of the optical density of the evaluation sample before the immersion into water Next, regarding each of Examples 1 to 6, a rate of improvement in optical density (ODi) was obtained, with Reference Example 1 using the same dye (Y-1) as those used in Examples 1 to 6 and not using the compound represented by the formula (1) as a reference, by the following expression.

$$ODi=(ODcr-ODc)/ODcr \times 100$$

In the expression,
ODi: the rate of improvement in optical density (%)
ODcr: the change in optical density in the reference example serving as the reference
ODc: the change in optical density in each of the examples Similarly, with respect to Examples 7 to 14, the rate of improvement in optical density ODi was obtained, with Reference Examples 2 to 9 as references thereof, respectively, by the above-described expression. The water-based inks of Reference Examples 2 to 9 use same dyes as those used in Examples 7 to 14, respectively, and do not use the compound represented by the formula (1). Further similarly, with respect to Comparative Examples 1 to 6, the rate of improvement in optical density ODi was obtained, with Reference Example 1 using the same dye (Y-1) as those used in Comparative Examples 1 to 6 and not using the compound represented by the formula (1), as the reference thereof, by the above-described expression.

As the rate of improvement in optical density ODi was higher, the water resistance of a printer matter was determined to be improved, and the water resistance of the printed matters were evaluated according to the following evaluation criterion.

<Criterion for Evaluation of Water Resistance of Printed Matter>

AA: The rate of improvement in the optical density ODi was not less than 25%.
A: The rate of improvement in the optical density ODi was in a range of not less than 15% to less than 25%.
B: The rate of improvement in the optical density ODi was in a range of not less than 5% to less than 15%.
C: The rate of improvement in the optical density ODi was less than 5%.

(2) Evaluation of Deposit in Water-Based Ink 5 g of the water-based ink of each of Examples 1 to 14 and Comparative Examples 1 to 6 was poured into an open vial (opening size (diameter): 20.2 mm). The open vial was stored in a thermostatic chamber for 5 days at a temperature of 60 degrees Celsius and a relative humidity of 40%. Both before and after the storage, the water-based ink in the open vial was observed with an optical microscope, and the presence or absence of any deposit was confirmed. The result of the observation was evaluated based on the following evaluation criterion.

<Evaluation Criterion of Deposit in Water-Based Ink>

A: Any deposit was not confirmed both before and after the storage.
B: Although any deposit was not confirmed before the storage, the presence of deposit was confirmed after the storage.
C: The presence of deposit was confirmed before the storage.

TABLE 1

| | | | EXAMPLES | | | | | |
|---|---|---|---|---|---|---|---|---|
| | | | 1 | 2 | 3 | 4 | 5 | 6 |
| Water-based Ink Composition (% by weight) | (D) | Dye (Y-1) (*1) | 3.00 | 3.00 | 3.00 | 3.00 | 3.00 | 3.00 |
| | | C. I. Direct Yellow 86 | — | — | — | — | — | — |
| | | Dye (M-1) (*2) | — | — | — | — | — | — |
| | | Dye (M-2) (*3) | — | — | — | — | — | — |
| | | Dye (C-1) (*4) | — | — | — | — | — | — |
| | | C. I. Direct Blue 199 | — | — | — | — | — | — |
| | | C. I. Acid Red 52 | — | — | — | — | — | — |
| | | C. I. Direct Yellow 132 | — | — | — | — | — | — |
| | | C. I. Acid Blue 9 | — | — | — | — | — | — |
| | (A) | AMISAFE (trade name) LMA-60 (*5) | 0.30 | 0.50 | 1.00 | 2.00 | 3.00 | — |
| | | CAE (trade name) (*6) | — | — | — | — | — | 0.50 |
| | | L-(+)-Arginine | — | — | — | — | — | — |
| | | N$^\alpha$-Benzoyl-L-arginine Ethyl Ester hydrochloride (*7) | — | — | — | — | — | — |
| | | N$^\alpha$-(tert-Butoxycarbonyl)-L-arginine Hydrochloride-Hydrate (*8) | — | — | — | — | — | — |
| | | L-(+)-Lysine | — | — | — | — | — | — |
| | | PAA (trade name)-01 (*9) | — | — | — | — | — | — |
| | | AMPHITOL (trade name) 24B (*10) | — | — | — | — | — | — |
| | | Glycerol | 17.0 | 18.0 | 15.0 | 12.0 | 10.0 | 15.0 |
| | | Polyethylene glycol 200 | 10.0 | 10.0 | 10.0 | 10.0 | 10.0 | 10.0 |
| | | Triethylene glycol-n-butyl ether | 4.00 | 4.00 | 4.00 | 4.00 | 4.00 | 4.00 |
| | | OLFINE (trade name) E1010 (*11) | 0.5 | 0.5 | 0.5 | 0.5 | 0.5 | 0.5 |
| | | Water | balance | balance | balance | balance | balance | balance |
| | | (D/A) | 10.0 | 6.0 | 3.0 | 1.5 | 1.0 | 6.0 |
| Evaluation of water resistance of printed matter | | | B | A | AA | AA | AA | B |
| Evaluation of deposit in water-based ink | | | A | A | A | A | B | B |

TABLE 2

| | | EXAMPLES | | | | | | | |
|---|---|---|---|---|---|---|---|---|---|
| | | 7 | 8 | 9 | 10 | 11 | 12 | 13 | 14 |
| Water-based Ink Composition (% by weight) | (D) Dye (Y-1) (*1) | — | — | — | — | — | — | — | — |
| | C. I. Direct Yellow 86 | 3.00 | — | — | — | — | — | — | — |
| | Dye (M-1) (*2) | — | 3.00 | — | — | — | — | — | — |
| | Dye (M-2) (*3) | — | — | 3.00 | — | — | — | — | — |
| | Dye (C-1) (*4) | — | — | — | 3.00 | — | — | — | — |
| | C. I. Direct Blue 199 | — | — | — | — | 3.00 | — | — | — |
| | C. I. Acid Red 52 | — | — | — | — | — | 3.00 | — | — |
| | C. I. Direct Yellow 132 | — | — | — | — | — | — | 3.00 | — |
| | C. I. Acid Blue 9 | — | — | — | — | — | — | — | 3.00 |
| (A) | AMISAFE (trade name) LMA-60 (*5) | 1.00 | 1.00 | 1.00 | 1.00 | 1.00 | 1.00 | 1.00 | 1.00 |
| | CAE (trade name) (*6) | — | — | — | — | — | — | — | — |
| | L-(+)-Arginine | — | — | — | — | — | — | — | — |
| | N$^\alpha$-Benzoyl-L-arginine Ethyl Ester hydrochloride (*7) | — | — | — | — | — | — | — | — |
| | N$^\alpha$-(tert-Butoxycarbonyl)-L-arginine Hydrochloride-Hydrate (*8) | — | — | — | — | — | — | — | — |
| | L-(+)-Lysine | — | — | — | — | — | — | — | — |
| | PAA (trade name)-01 (*9) | — | — | — | — | — | — | — | — |
| | AMPHITOL (trade name) 24B (*10) | — | — | — | — | — | — | — | — |
| | Glycerol | 13.00 | 14.00 | 15.00 | 16.00 | 19.00 | 16.00 | 16.00 | 15.00 |
| | Polyethylene glycol 200 | 10.0 | 10.0 | 10.0 | 10.0 | 10.0 | 10.0 | 10.0 | 10.0 |
| | Triethylene glycol-n-butyl ether | 4.00 | 4.00 | 4.00 | 4.00 | 4.00 | 4.00 | 4.00 | 4.00 |
| | OLFINE (trade name) E1010 (*11) | 0.5 | 0.5 | 0.5 | 0.5 | 0.5 | 0.5 | 0.5 | 0.5 |
| | Water | balance | balance | balance | balance | balance | balance | balance | balance |
| | (D/A) | 3.0 | 3.0 | 3.0 | 3.0 | 3.0 | 3.0 | 3.0 | 3.0 |
| Evaluation of water resistance of printed matter | | A | AA | AA | A | A | B | B | B |
| Evaluation of deposit in water-based ink | | A | A | A | B | B | B | B | B |

TABLE 3

| | | COMPARATIVE EXAMPLES | | | | | |
|---|---|---|---|---|---|---|---|
| | | 1 | 2 | 3 | 4 | 5 | 6 |
| Water-based Ink Composition (% by weight) | (D) Dye (Y-1) (*1) | 3.00 | 3.00 | 3.00 | 3.00 | 3.00 | 3.00 |
| | C. I. Direct Yellow 86 | — | — | — | — | — | — |
| | Dye (M-1) (*2) | — | — | — | — | — | — |
| | Dye (M-2) (*3) | — | — | — | — | — | — |
| | Dye (C-1) (*4) | — | — | — | — | — | — |
| | C. I. Direct Blue 199 | — | — | — | — | — | — |
| | C. I. Acid Red 52 | — | — | — | — | — | — |
| | C. I. Direct Yellow 132 | — | — | — | — | — | — |
| | C. I. Acid Blue 9 | — | — | — | — | — | — |
| (A) | AMISAFE (trade name) LMA-60 (*5) | — | — | — | — | — | — |
| | CAE (trade name) (*6) | — | — | — | — | — | — |
| | L-(+)-Arginine | 1.00 | — | — | — | — | — |
| | N$^\alpha$-Benzoyl-L-arginine Ethyl Ester hydrochloride (*7) | — | 1.00 | — | — | — | — |
| | N$^\alpha$-(tert-Butoxycarbonyl)-L-arginine Hydrochloride-Hydrate (*8) | — | — | 1.00 | — | — | — |
| | L-(+)-Lysine | — | — | — | 1.00 | — | — |
| | PAA (trade name)-01 (*9) | — | — | — | — | 1.00 | — |
| | AMPHITOL (trade name) 24B (*10) | — | — | — | — | — | 1.00 |
| | Glycerol | 16.00 | 16.00 | 16.00 | 16.00 | 10.00 | 10.00 |
| | Polyethylene glycol 200 | 10.0 | 10.0 | 10.0 | 10.0 | 10.0 | 10.0 |
| | Triethylene glycol-n-butyl ether | 4.00 | 4.00 | 4.00 | 4.00 | 4.00 | 4.00 |
| | OLFINE (trade name) E1010 (*11) | 0.5 | 0.5 | 0.5 | 0.5 | 0.5 | 0.5 |
| | Water | balance | balance | balance | balance | balance | balance |
| | (D/A) | 3.0 | 3.0 | 3.0 | 3.0 | 3.0 | 3.0 |
| Evaluation of water resistance of printed matter | | C | C | C | C | A | C |
| Evaluation of deposit in water-based ink | | A | A | A | A | C | B |

TABLE 4

| | | REFERENCE EXAMPLES | | | | | | | | |
|---|---|---|---|---|---|---|---|---|---|---|
| | | 1 | 2 | 3 | 4 | 5 | 6 | 7 | 8 | 9 |
| Water-based Ink Composition (% by weight) | (D) Dye (Y-1) (*1) | 3.00 | — | — | — | — | — | — | — | — |
| | C. I. Direct Yellow 86 | — | 3.00 | — | — | — | — | — | — | — |
| | Dye (M-1) (*2) | — | — | 3.00 | — | — | — | — | — | — |
| | Dye (M-2) (*3) | — | — | — | 3.00 | — | — | — | — | — |

TABLE 4-continued

| | REFERENCE EXAMPLES | | | | | | | | |
|---|---|---|---|---|---|---|---|---|---|
| | 1 | 2 | 3 | 4 | 5 | 6 | 7 | 8 | 9 |
| Dye (C-1) (*4) | — | — | — | — | 3.00 | — | — | — | — |
| C. I. Direct Blue 199 | — | — | — | — | — | 3.00 | — | — | — |
| C. I. Acid Red 52 | — | — | — | — | — | — | 3.00 | — | — |
| C. I. Direct Yellow 132 | — | — | — | — | — | — | — | 3.00 | — |
| C. I. Acid Blue 9 | — | — | — | — | — | — | — | — | 3.00 |
| (A) AMISAFE (trade name) LMA-60 (*5) | — | — | — | — | — | — | — | — | — |
| CAE (trade name) (*6) | — | — | — | — | — | — | — | — | — |
| L-(+)-Arginine | — | — | — | — | — | — | — | — | — |
| Nα-Benzoyl-L-arginine Ethyl Ester hydrochloride (*7) | — | — | — | — | — | — | — | — | — |
| Nα-(tert-Butoxycarbonyl)-L-arginine Hydrochloride-Hydrate (*8) | — | — | — | — | — | — | — | — | — |
| L-(+)-Lysine | — | — | — | — | — | — | — | — | — |
| PAA (trade name)-01 (*9) | — | — | — | — | — | — | — | — | — |
| AMPHITOL (trade name) 24B (*10) | — | — | — | — | — | — | — | — | — |
| Glycerol | 18.00 | 16.00 | 17.00 | 18.00 | 19.00 | 22.00 | 19.00 | 19.00 | 18.00 |
| Polyethylene glycol 200 | 10.0 | 10.0 | 10.0 | 10.0 | 10.0 | 10.0 | 10.0 | 10.0 | 10.0 |
| Triethylene glycol-n-butyl ether | 4.00 | 4.00 | 4.00 | 4.00 | 4.00 | 4.00 | 4.00 | 4.00 | 4.00 |
| OLFINE (trade name) E1010 (*11) | 0.5 | 0.5 | 0.5 | 0.5 | 0.5 | 0.5 | 0.5 | 0.5 | 0.5 |
| Water | balance | balance | balance | balance | balance | balance | balance | balance | balance |

The components *1 to *11 contained in the water-based inks indicated in TABLES 1 to 4 are as follows. Note that the blending amounts of the dye, arginine, arginine derivative, lysine, cationic polymer and surfactant indicated in TABLES 1 to 4 each represent a solid content amount (active ingredient amount)

*1: a dye represented by the formula (Y-1), specifically, a dye represented by the formula (Y-1a).

*2: a dye represented by the formula (M-1), specifically, a dye represented by the formula (M-1a).

*3: a dye represented by the formula (M-2), specifically, a dye represented by the formula (M-2a).

*4: a dye represented by the formula (C-1), specifically, a dye represented by the formula (C-1a).

*5: a compound represented by the formula (1), specifically, a compound represented by the formula (1-A) and neutralized by hydrochloric acid, manufactured by AJINOMOTO HEALTHY SUPPLY CO., INC.; active ingredient amount=60%.

*6: a compound represented by the formula (1), specifically, a compound represented by the formula (1-B) and neutralized by pyrrolidonecarboxylic acid, manufactured by AJINOMOTO HEALTHY SUPPLY CO., INC.; active ingredient amount=90%.

*7: Arginine derivative.

*8: Arginine derivative.

*9: Polyallylamine, manufactured by NITTOBO MEDICAL CO., LTD.; active ingredient amount=15%.

*10: Betaine-type amphoteric surfactant, manufactured by KAO CORPORATION; active ingredient amount=26%.

*11: Nonionic surfactant, manufacture by NISSIN CHEMICAL INDUSTRY CO., LTD; active ingredient amount=100%.

As indicated in TABLE 1 and TABLE 2, in Examples 1 to 14, the results of the evaluation of the water resistance of the printed matter and the evaluation of the deposit in the water-based ink were satisfactory. Namely, in the water-based inks of Examples 1 to 14, the water resistance of the printer matter was high and the generation of deposit in the water-based ink could be suppressed.

Although the water-based inks of Examples 1 to 5 contain the same dye and the same compound represented by the formula (1), the blending amounts of the compound represented by the formula (1) are different among the water-based inks of Examples 1 to 5. Among Examples 1 to 5, in Examples 2 to 4 in each of which the blending amount of the compound represented by the formula (1) was in a range of 0.5% by weight to 2.0% by weight and the ratio (D/A) of the blending amount of the dye (D) to the blending amount of the compound (A) represented by the formula (1) was in a range of 1.5 to 6.0, the water resistance of the printed matter and the effect of suppressing the occurrence of deposit in the water-based ink were particularly high. In the evaluation of the deposit in each of Examples 2 to 4, even after the water-based ink was stored in the thermostatic chamber, namely even after a part or portion of the solvent of the water-based ink was evaporated, the occurrence of the deposit in the water-based ink could be suppressed. Note that in Example 1 in which the blending amount of the compound represented by the formula (1) was less than 0.5% by weight and the ratio (D/A) exceeded 6.0, the water resistance of the printed matter was lowered to some extent. Further, in Example 5 in which the blending amount of the compound represented by the formula (1) exceeded 2.0% by weight and the ratio (D/A) was less than 1.5, although any deposit was not confirmed in the water-based ink before the storage in the thermostatic chamber, the deposit was confirmed in the water-based ink after the storage in the thermostatic chamber in the evaluation of the deposit in the water-based ink.

Although the water-based inks of Examples 2 and 6 contain the compound represented by the formula (1) in a same blending amount, the kinds of the compound represented by the formula (1) contained therein are different. As compared with Example 6 using the compound represented by the formula (1-B), Example 2 using the compound represented by the formula (1-A) had particularly high water resistance of the printer matter and had particularly high effect of suppressing the occurrence of deposit in the water-based ink.

Further, although the water-based inks of Examples 3 and 7 to 14 contain the same kind of the compound represented by the formula (1) in the same blending amount, the kinds of the dye contained therein are different. Among Examples 3 and 7 to 14, in Examples 3 and 7 to 9 each using any one of the dye represented by the formula (Y-1), C. I. Direct Yellow 86, the dye represented by formula (M-1) and the dye represented by the formula (M-2), the water resistance of the printed matter and/or the effect of suppressing the occurrence of deposit in the water-based ink were/was particularly high, as compared with Examples 10 to 14 each using a dye different from those used in Examples 3 and 7 to 9. In the evaluation of the deposit in each of Examples 3 and 7 to 9, even after the water-based ink was stored in the thermostatic chamber, namely even after a part or portion of the solvent of the water-based ink was evaporated, the occurrence of the deposit in the water-based ink could be suppressed.

On the other hand, as indicated in TABLE 3, in Comparative Example 1 using the arginine, Comparative Examples 2 and 3 each using the arginine derivative, and Comparative Example 4 using the lysine, instead of using the compound represented by the formula (1), the water resistance of the printed matter was low. The reason for this is presumed as follows. Namely, the arginine, etc., used in Comparative Examples 1 to 4 has a cationic group, but does not has a relatively long alkyl group corresponding to the hydrophobic part possessed by $X_3$ in the formula (1). Accordingly, the arginine, etc., used in Comparative Examples 1 to 4 hardly penetrated and adsorbed to the recording medium, as compared with the compound represented by the formula (1), and thus resulted in a low water resistance of the printed matter. Further, in the evaluation of deposit in Comparative Example 5 using the polyallylamine as the cationic polymer, instead of using the compound represented by the formula (1), the deposit was generated even before the water-based ink was stored in the thermostatic chamber. The reason for this is presumed as follows. Namely, although the polyallylamine has a cationic group allowing the dye to aggregate, but does not have a part or portion corresponding to the hydrophobic part or portion negatively charged and possessed by $X_3$ in the formula (1). Accordingly, it is presumed that the polyallylamine was easily aggregated together with the dye and caused the generation of deposit in the water-based ink. Furthermore, in Comparative Example 6 using the betaine-type amphoteric surfactant, instead of using the compound represented by the formula (1), the water resistance of the recorded matter was low. The reason for this is presumed as follows. Namely, the betaine-type amphoteric surfactant used in Comparative Example 6 has a quaternary amino group that is a cationic group, and also has a relatively long alkyl group (of which number of the carbon atom is about 12) corresponding to the hydrophobic part possessed by $X_3$ in the formula (1). However, the cationic group possessed by the betaine-type amphoteric surfactant has a lower effect of allowing the dye to aggregate, as compared with the cationic group (guanidino group) possessed by the compound represented by the formula (1). Accordingly, it is presumed that the cationic group possessed by the betaine-type amphoteric surfactant could not obtain any sufficient water resistance of the printed matter, for the above-described presumed reason.

Since the water-based ink related to the present teaching has a high water resistance of the printed matter, and is capable of suppressing the occurrence of deposit in the water-based ink. The applicability of the water-based ink related to the present teaching is not particularly limited, and is widely applicable to a variety of kinds of ink-jet recording.

What is claimed is:

1. A water-based ink for ink-jet recording, comprising:
a dye;
water; and
a compound represented by the following formula (1):

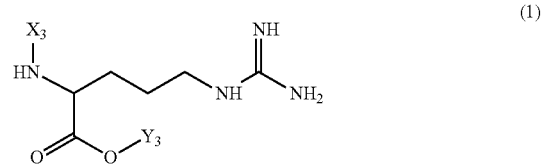

wherein in the formula (1), $X_3$ represents a group represented by the following formula (2) and $Y_3$ represents a hydrogen atom, or the $X_3$ represents a group represented by the following formula (3) and the $Y_3$ is an ethyl group; and

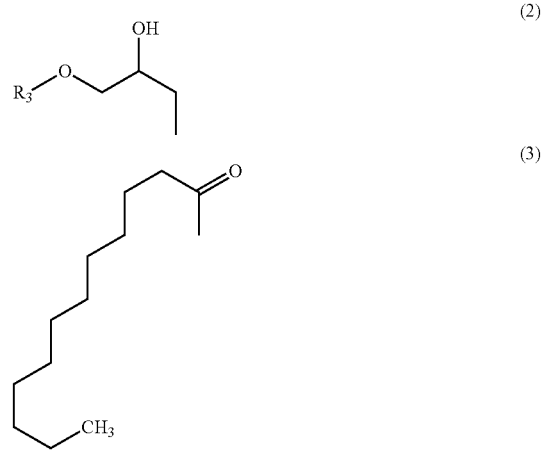

in the formula (2), $R_3$ represents a straight-chain or branched-chain alkyl group having 12 to 14 carbons.

2. The water-based ink for ink-jet recording according to claim 1, wherein the compound represented by the formula (1) is a compound represented by the following formula (1-A):

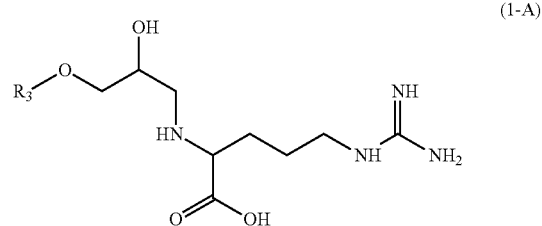

wherein in the formula (1-A), $R_3$ represents the straight-chain or branched-chain alkyl group having 12 to 14 carbons.

3. The water-based ink for ink-jet recording according to claim 1, wherein the compound represented by the formula (1) is a compound represented by the following formula (1-B).

(1-B)

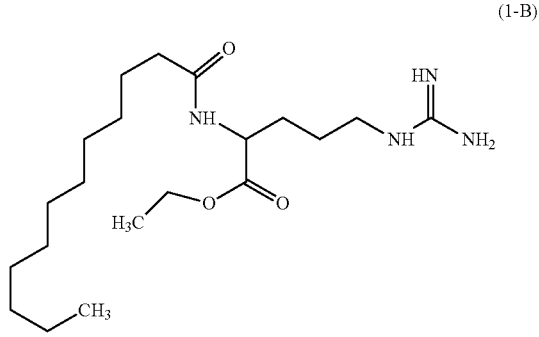 [SMILES: CCCCCCCCCCCC(=O)NC(CCCNC(=N)N)C(=O)OCC]

4. The water-based ink for ink-jet recording according to claim 1, wherein a guanidino group in the compound represented by the formula (1) is neutralized by hydrochloric acid or pyrrolidone carboxylic acid.

5. The water-based ink for ink-jet recording according to claim 2, wherein a guanidino group in the compound represented by the formula (1-A) is neutralized by hydrochloric acid.

6. The water-based ink for ink-jet recording according to claim 3, wherein a guanidino group in the compound represented by the formula (1-B) is neutralized by pyrrolidone carboxylic acid.

7. The water-based ink for ink-jet recording according to claim 1, wherein a blending amount of the compound represented by the formula (1) in the water-based ink is in a range of 0.3% by weight to 3.0% by weight.

8. The water-based ink for ink-jet recording according to claim 1, wherein a blending amount of the compound represented by the formula (1) in the water-based ink is not less than 0.5% by weight.

9. The water-based ink for ink-jet recording according to claim 1, wherein a blending amount of the compound represented by the formula (1) in the water-based ink is not more than 2.0% by weight.

10. The water-based ink for ink-jet recording according to claim 1, wherein a blending amount of the compound represented by the formula (1) in the water-based ink is in a range of 0.5% by weight to 2.0% by weight.

11. The water-based ink for ink-jet recording according to claim 1, wherein a ratio (D/A) of a blending amount (D) of the dye to a blending amount (A) of the compound represented by the formula (1) in the water-based ink is not less than 1.5.

12. The water-based ink for ink-jet recording according to claim 1, wherein a ratio (D/A) of a blending amount (D) of the dye to a blending amount (A) of the compound represented by the formula (1) in the water-based ink is not more than 6.0.

13. The water-based ink for ink-jet recording according to claim 1, wherein a ratio (D/A) of a blending amount (D) of the dye to a blending amount (A) of the compound represented by the formula (1) in the water-based ink is in a range of 1.5 to 6.0.

14. The water-based ink for ink-jet recording according to claim 1, wherein a blending amount of the compound represented by the formula (1) in the water-based ink is in a range of 0.5% by weight to 2.0% by weight; and a ratio (D/A) of a blending amount (D) of the dye to a blending amount (A) of the compound represented by the formula (1) in the water-based ink is in a range of 1.5 to 6.0.

15. The water-based ink for ink-jet recording according to claim 1, wherein the dye has not less than 7 nitrogen atoms in a chemical structure of the dye.

16. The water-based ink for ink-jet recording according to claim 1, wherein the dye has 7 to 21 nitrogen atoms in a chemical structure of the dye.

17. The water-based ink for ink-jet recording according to claim 1, wherein the dye is one selected from the group consisting of: a dye represented by the following formula (Y-1), C.I. Direct Yellow 86, a dye represented by the following formula (M-1) and a dye represented by the following formula (M-2), (Y-1)

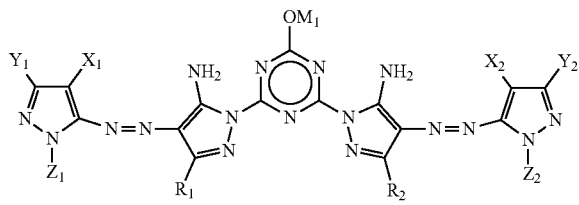

wherein in the formula (Y-1),
R$_1$, R$_2$, Y$_1$, and Y$_2$ each represent a monovalent group, and are identical to or different from each other,
X$_1$ and X$_2$ each represent an electron attractive group, and are identical to or different from each other,
Z$_1$ and Z$_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and the Z$_1$ and Z$_2$ are identical to or different from each other, and
M$_1$ represents a hydrogen atom or a cation;

(M-1)

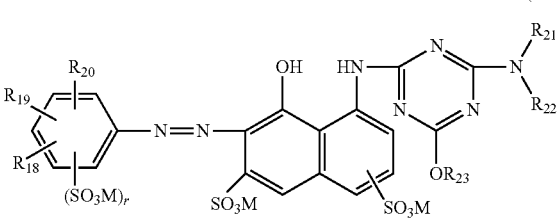

wherein in the formula (M-1),
r is 0, 1 or 2,
R$_{18}$, R$_{19}$ and R$_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group, a substituted or unsubstituted arylsulfonyl group, a carboxy group or a carboxylate group, the $R_{18}$, $R_{19}$ and $R_{20}$ are identical to or different from each other, $R_{21}$, $R_{22}$ and $R_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, the $R_{21}$, $R_{22}$ and $R_{23}$ are identical to or different from each other, in a case that any one of the $R_{18}$ to $R_{23}$ has an acid group or groups, all the acid groups are not neutralized, or a part or all the acid groups is a salt type group;

each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$, and the three Ms are identical to or different from each other; and

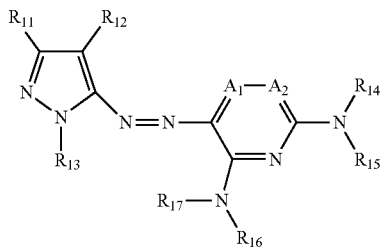
(M-2)

wherein in the formula (M-2), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, the $R_{14}$, $R_{15}$, $R_{16}$, and $R_{17}$ are identical to or different from each other, not both of the $R_{14}$ and $R_{15}$ are the hydrogen atoms, and not both of the $R_{16}$ and $R_{17}$ are the hydrogen atoms; and $A_1$ and $A_2$ are both substituted or unsubstituted carbon atoms, or one of the $A_1$ and $A_2$ is a substituted or unsubstituted carbon atom and the other is a nitrogen atom.

18. A water based ink for ink-jet recording as defined in claim 1, wherein the water based ink is contained in an ink container.

* * * * *